(12) United States Patent
Bergamini et al.

(10) Patent No.: US 10,294,949 B2
(45) Date of Patent: May 21, 2019

(54) MULTISTAGE TURBOMACHINE WITH EMBEDDED ELECTRIC MOTORS

(71) Applicant: Nuovo Pignone Srl, Florence (IT)

(72) Inventors: Lorenzo Bergamini, Bari (IT); Marco Cipriani, Bari (IT)

(73) Assignee: Nuovo Pignone Srl, Florence (IT)

( * ) Notice: Subject to any disclaimer, the term of this patent is extended or adjusted under 35 U.S.C. 154(b) by 164 days.

(21) Appl. No.: 15/115,722

(22) PCT Filed: Feb. 2, 2015

(86) PCT No.: PCT/EP2015/052067
§ 371 (c)(1),
(2) Date: Aug. 1, 2016

(87) PCT Pub. No.: WO2015/114136
PCT Pub. Date: Aug. 6, 2015

(65) Prior Publication Data
US 2017/0159665 A1    Jun. 8, 2017

(30) Foreign Application Priority Data
Feb. 3, 2014 (IT) ................. FI2014A0024

(51) Int. Cl.
*F04D 27/00* (2006.01)
*F04D 19/02* (2006.01)
(Continued)

(52) U.S. Cl.
CPC ............ *F04D 27/004* (2013.01); *F04D 1/06* (2013.01); *F04D 3/00* (2013.01); *F04D 13/06* (2013.01);
(Continued)

(58) Field of Classification Search
CPC .... F04D 27/004; F04D 15/0066; F04D 29/70; F04D 29/06; F04D 29/58; F04D 29/22;
(Continued)

(56) References Cited

U.S. PATENT DOCUMENTS

| 4,147,473 A | 4/1979 | Bufalov |
| 4,830,584 A | 5/1989 | Mohn |

(Continued)

FOREIGN PATENT DOCUMENTS

| CN | 101535658 A | 9/2009 |
| EP | 0398156 A2 | 11/1990 |

(Continued)

OTHER PUBLICATIONS

Italian Search Report issued in connection with corresponding Italian application FI2014A000024 dated Sep. 30, 2014.

(Continued)

*Primary Examiner* — Charles G Freay
*Assistant Examiner* — David N Brandt
(74) *Attorney, Agent, or Firm* — GE Global Patent Operation; Robert D. Crawford, II

(57) ABSTRACT

A multistage turbomachine is disclosed, comprising a casing with a fluid inlet and a fluid outlet and a plurality of stages arranged in the casing. A flow path extends from the fluid inlet to the fluid outlet through the sequentially arranged stages. Each stage is comprised of a rotating impeller and an electric motor embedded in the casing and arranged for rotating the impeller at a controlled rotary speed. Each electric motor comprises a motor rotor, arranged on the impeller and integrally rotating therewith, and a motor stator stationarily arranged in the casing. Pairs of sequentially arranged impellers are configured for rotation in opposite directions.

20 Claims, 21 Drawing Sheets

(51) Int. Cl.
*F04D 25/06* (2006.01)
*F04D 29/056* (2006.01)
*F04D 17/12* (2006.01)
*F04D 1/06* (2006.01)
*F04D 3/00* (2006.01)
*F04D 13/06* (2006.01)
*F04D 15/00* (2006.01)
*F04D 29/06* (2006.01)
*F04D 29/18* (2006.01)
*F04D 29/22* (2006.01)
*F04D 29/42* (2006.01)
*F04D 29/52* (2006.01)
*F04D 29/58* (2006.01)
*F04D 29/70* (2006.01)

(52) U.S. Cl.
CPC .......... *F04D 15/0066* (2013.01); *F04D 17/12* (2013.01); *F04D 17/122* (2013.01); *F04D 19/02* (2013.01); *F04D 19/024* (2013.01); F04D 19/026 (2013.01); F04D 25/0606 (2013.01); *F04D 29/056* (2013.01); *F04D 29/06* (2013.01); *F04D 29/181* (2013.01); *F04D 29/22* (2013.01); *F04D 29/42* (2013.01); *F04D 29/52* (2013.01); *F04D 29/58* (2013.01); *F04D 29/70* (2013.01)

(58) Field of Classification Search
CPC .......... F04D 29/181; F04D 29/52; F04D 3/00; F04D 19/02; F04D 25/0606; F04D 13/06; F04D 17/12; F04D 1/06; F04D 29/42; F05D 2270/02; H02K 16/00; H02K 16/04
See application file for complete search history.

(56) References Cited

U.S. PATENT DOCUMENTS

| | | | | |
|---|---|---|---|---|
| 5,017,087 A | * | 5/1991 | Sneddon | F01D 15/08 415/221 |
| 5,187,938 A | * | 2/1993 | Mraz | F04D 19/02 415/182.1 |
| 6,244,835 B1 | * | 6/2001 | Antaki | F04D 3/005 415/900 |
| 7,150,600 B1 | * | 12/2006 | Vennat | E21B 43/128 415/199.2 |
| 7,489,062 B2 | | 2/2009 | Shah et al. | |
| 8,253,298 B2 | | 8/2012 | Saban et al. | |
| 2006/0245959 A1 | * | 11/2006 | LaRose | F04D 3/02 417/423.5 |
| 2009/0067983 A1 | | 3/2009 | Estlick | |
| 2009/0155104 A1 | * | 6/2009 | Takeshita | F04D 19/007 417/423.5 |
| 2010/0033041 A1 | * | 2/2010 | Watanabe | F04D 19/007 310/63 |
| 2010/0284829 A1 | * | 11/2010 | Sloteman | F04D 9/003 417/199.1 |
| 2011/0025067 A1 | | 2/2011 | Cipriani | |
| 2015/0104329 A1 | * | 4/2015 | Chin | F04B 49/007 417/53 |
| 2015/0104335 A1 | * | 4/2015 | Faller | F04D 29/5806 417/244 |

FOREIGN PATENT DOCUMENTS

| | | | | |
|---|---|---|---|---|
| EP | 2 369 721 A2 | 9/2011 | | |
| WO | 2011/154045 A1 | 12/2011 | | |
| WO | 2015003711 A1 | 1/2015 | | |
| WO | WO2015/070913 A1 | * | 5/2015 | ............. E21B 43/12 |
| WO | WO 2015070913 A1 | * | 5/2015 | ............. E21B 43/12 |

OTHER PUBLICATIONS

International Search Report and Written Opinion issued in connection with corresponding PCT application PCT/EP2015/052067 dated May 13, 2015.

Machine Translation and First Office Action and Search issued in connection with corresponding CN Application No. 201580007058.1 dated Jun. 4, 2018.

* cited by examiner

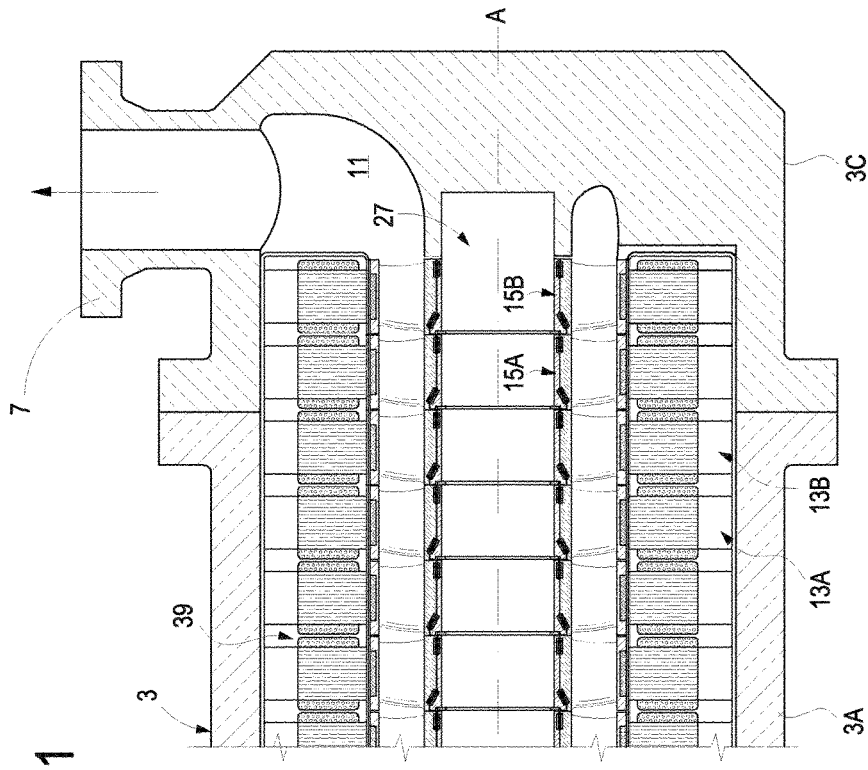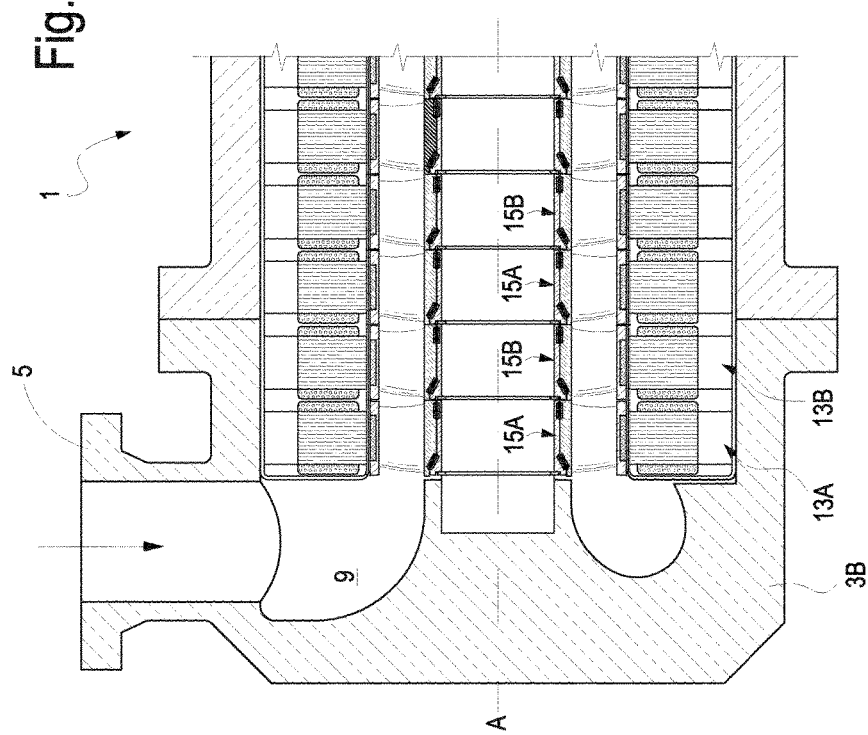
Fig.1

MULTISTAGE TURBOMACHINE WITH EMBEDDED ELECTRIC MOTORS

TECHNICAL FIELD

The subject matter disclosed herein refers to turbomachines, and more specifically to pumps or compressors suited particularly for pumping mixed phase, i.e. multiphase fluids, such as mixed gas and oil.

BACKGROUND

Submarine gas and oil compressors and pumps are used in offshore installations to extract hydrocarbons from submarine oilfields. Submarine, downhole and ESPs (Electrical Submersible Pumps) turbomachines are driven by electric motors which are arranged coaxial with the turbomachine stages.

The flow processed by the turbomachine usually contains a mixture of gaseous and liquid hydrocarbons with a variable gas volume fraction (GVF) or liquid volume fraction (LVF). Typically, wet gas (i.e. gas containing a fraction of liquid) is processed by wet gas compressors. High speed centrifugal wet gas compressors can usually not tolerate a volume percentage of liquid phase larger than 5%, i.e. they require operating at GVF>95%. Large size scrubber-separators are thus often required to remove excess liquid content from the processed flow.

The presence of a mixed flow causes serious complications in processing the fluid in the turbomachine. The efficiency of a turbomachine designed for operating at a design GVF value rapidly drops when the machine operates far from the design GVF. Assuming a design GVF of 40%, the efficiency can drop by 10 points when operating below 20% or above 60%.

To address the difficulties in handling mixed gas/liquid flows, and specifically wet gas with GVF>80%, it has been suggested (U.S. Pat. No. 4,830,584) to use multistage pumps and compressors, having a plurality of axially aligned stages arranged in a turbomachine casing and driven by two electric motors arranged outside the turbomachine casing. Two co-axial shafts drive in rotation oppositely rotating impellers of the multistage turbomachine. The number of stages which can be used in this kind of turbomachines is limited by the need of reducing the axial length of the machine. This limits the achievable pressure rise through the turbomachine. The arrangement of co-axial shafts for driving counter-rotating impellers adds to the complexity of the turbomachine, however.

Limited allowable axial length of the turbomachine-motor assembly, typically within 7 meters for subsea applications, also severely limits the total power available. As a matter of fact, electric motors above 4 MW can be longer than allowed by the above mentioned limits, unless a very high rotary speed is used, which is detrimental to the life of the turbomachine.

There is thus a need for a more efficient turbomachine for processing mixed gas/liquid flows, which at least partly alleviates one or more of the above mentioned drawbacks of the current art turbomachines.

BRIEF DESCRIPTION

According to one aspect, a multistage turbomachine is provided, including a casing with a fluid inlet and a fluid outlet; a plurality of stages arranged in the casing; and a flow path extending from the fluid inlet to the fluid outlet through the sequentially arranged stages. Each stage is comprised of a rotating impeller and an electric motor embedded in the casing and arranged for rotating the impeller at a controlled rotary speed. Each electric motor includes a motor rotor arranged on the impeller and integrally rotating therewith and a motor stator stationarily arranged in the casing. Pairs of sequentially arranged impellers are configured for rotation in opposite directions. In an embodiment, the paired impellers rotating in opposite directions are arranged directly adjacent to one another. Directly adjacent to one another means that no stationary blades or buckets are arranged there between. The fluid exiting the upstream impeller is delivered directly into the downstream impeller. In some embodiments the turbomachine is entirely free of stationary blades between sequentially arranged, counter-rotating impellers, thus reducing the overall length of the turbomachine.

In some embodiments all the impellers of the turbomachine are counter-rotating, i.e. each impeller rotates in a direction opposite with respect to adjacent impeller(s). In other embodiments, the machine can further include also sequentially arranged impellers which are rotating in the same direction, with stationary buckets or blades arranged therebetween.

According to some embodiments, the turbomachine includes a control arrangement, configured for individually controlling the operating conditions of each electric motor. The control arrangement can be programmed to rotate each embedded motor and thus each impeller at a rotational speed which can vary from one impeller to the other based e.g. upon the gas volume fraction of the fluid being processed by the turbomachine. The control arrangement can be comprised of one or more control units.

It shall be understood that in some embodiments the turbomachine includes only such impellers which are each provided with its own independently controlled, embedded electric motor. In other embodiments, however, two or more auxiliary or additional impellers can be controlled by one and the same electric motor or else by two different electric motors, but co-rotating at the same rotational speed. The present disclosure also encompasses, therefore, turbomachines wherein independently speed-controlled impellers can be combined with other impellers, which are not independently controllable as to the rotational speed thereof.

In some embodiments control of the embedded motors can be a torque control or a rotary speed control. For example, the control unit can be programmed for controlling the speed of the electric motors as a function of at least one compressibility-related parameter, e.g. based on the compressibility of the fluid processed by the turbomachine, since compressibility changes based on the gas volume fraction.

In some embodiments the turbomachine can be shaftless, or include a central, non-rotating shaft rotatingly supporting the impellers and relevant rotors of the embedded motors. Active magnetic bearings, rolling bearings, journal bearings, or combinations thereof can be used. Product-lubricated bearings may be particularly beneficial.

The motor stator of at least some of the stages can be arranged around the respective motor rotor mounted on the impeller, such that the motor stator surrounds the motor rotor. The motor rotor and the impeller of each stage can be rotatingly supported by the motor stator, rather than by a central shaft. In some embodiments, a reversed arrangement can be provided, with the stator arranged centrally, and the rotor and relevant impeller surrounding the stator.

The turbomachine can include a plurality of sequentially arranged axial impellers. In some embodiments, all the stages include axial impellers. In other embodiments, the turbomachine can include one or more radial or axial-radial impellers, e.g. arranged in a machine section placed downstream of a first machine section including axial impellers.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIG. 1 illustrates an axial cross-section of a turbomachine in accordance with one embodiment of the present disclosure;

DETAILED DESCRIPTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 2:
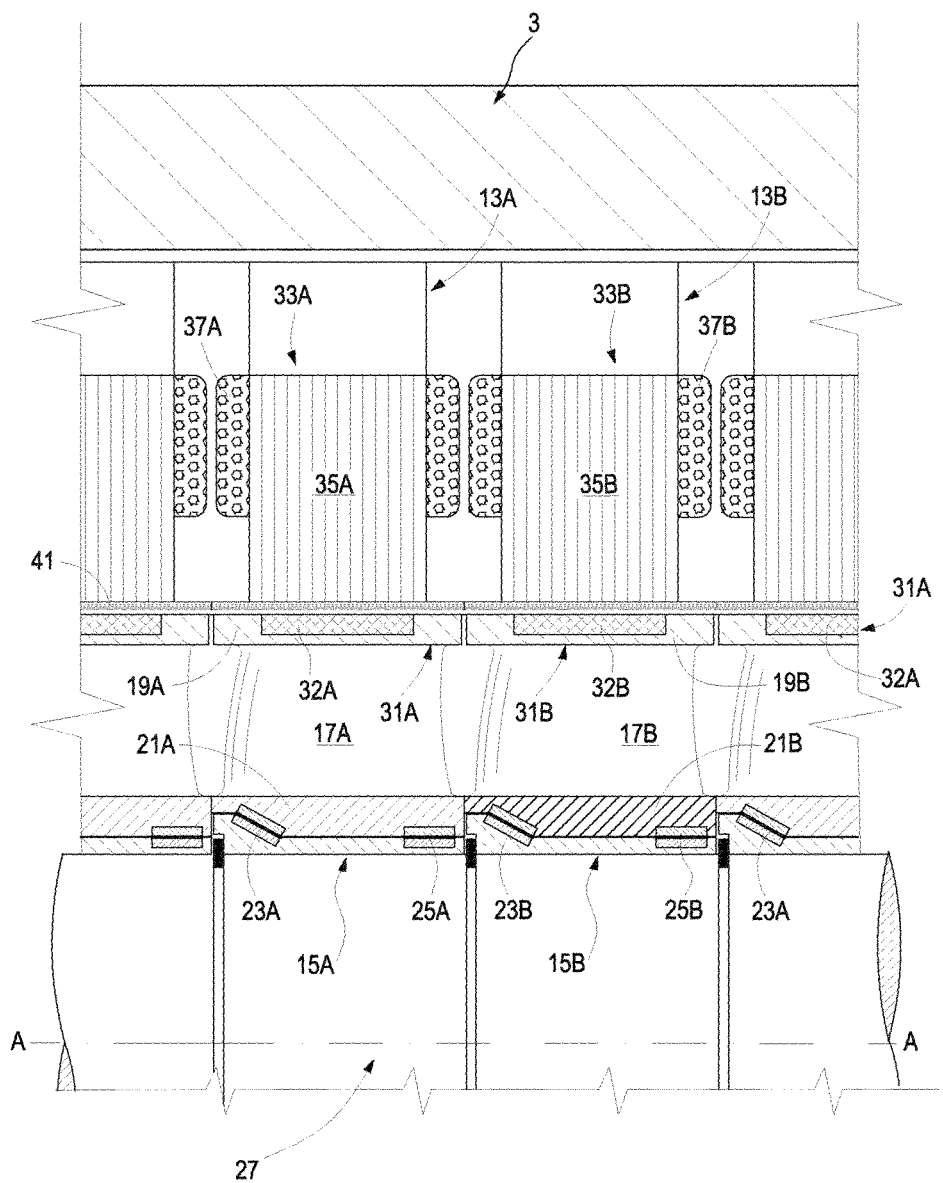
FIG. 2 illustrates an enlargement of FIG. 1.

FIGS. 1 and 2 illustrate embodiments of a turbomachine according to the present disclosure. The turbomachine is labeled 1 as a whole and comprises an outer casing 3, which is provided with an inlet manifold 5 and an outlet manifold 7.

The turbomachine can be of the vertically-split or horizontally-split type. In the embodiment shown in FIG. 1 the turbomachine is of the vertically-split type, wherein the casing 3 is comprised of a central barrel 3A and two end portions 3B, 3C, sealingly connected to one another for forming the casing 3.

The turbomachine 1 can be a wet-gas compressor or a multiphase pump, and more generally a turbomachine suitable for boosting the pressure of a multiphase fluid, e.g. a liquid containing a percentage of compressible gas, or else a gas containing a percentage of liquid. FIGS. 1 and 2 illustrate more specifically a multiphase pump, suitable for processing a liquid flow containing a percentage of gaseous medium.

In some embodiments, as shown in FIGS. 1 and 2, the turbomachine 1 is a generally axial machine. The turbomachine 1 can be comprised of an inlet plenum 9 in fluid communication with the inlet manifold 5, and an outlet plenum 11 in fluid communication with the outlet manifold 7. The process fluid flows in a generally axial direction through the turbomachine from the inlet plenum 9 towards the outlet plenum 11, across a plurality of stages, 13A, 13B.

In some embodiments, the turbomachine 1 includes an even number of stages, arranged in pairs, each pair including a first stage 13A and a second stage 13B arranged in sequence in the direction of flow. As will be described in more detail herein below, each stage includes a rotating impeller, driven into rotation by a respective embedded motor. In an embodiment, the impellers of two sequentially arranged stages of each pair are counter-rotating, i.e. they are configured and controlled for rotating in two opposite directions, one in clockwise direction and the other in counter-clockwise direction. In each pair of stages the first, i.e. most upstream, impeller rotates in one and the same direction, and the second, i.e. most downstream impeller rotates in the other direction, such that each impeller rotating in one direction is always followed by a next impeller rotating in the opposite direction.

As best shown in FIG. 2, with continuing reference to FIG. 1, each stage 13A, 13B includes an impeller 15A, 15B. The impellers 15A, 15B are provided with respective impeller blades 17A, 17B. Each impeller blade 17A, 17B can be provided with a root portion, an airfoil portion and a tip portion. The tip portions of the annularly arranged blades 17A, 17B of each impeller form an outer ring or shroud 19A, 19B. In some embodiments the ring or shroud 19A, 19B can be formed by a monolithic component. Similarly, the roots 21A, 21B of the blades 17A, 17B of each impeller can form a monolithic ring.

In some embodiments each impeller 15A, 15B is supported by means of respective bearing arrangements 23A, 25A and 23B, 25B on an inner shaft 27. The shaft 27 can be stationarily mounted in the casing 3. As schematically shown in FIG. 2 the bearing arrangement 23A, 25A and 23B, 25B can have a combined radial loading and axial loading capacity, i.e. they can support both axial and radial loads. According to some embodiments, the bearing arrangements 23A, 25A, 23B, 25B can be lubricated and cooled by the liquid part of the fluid being processed by the turbomachine 1.

Each impeller 15A, 15B can rotate on shaft 27 independently of the other impellers, so that sequentially arranged impellers can rotate in opposite directions and at different angular speeds.

Each stage 13A, 13B is driven into rotation by a respective embedded electric motor. According to embodiments of the technique disclosed herein, permanent magnets electric motors (shortly PM electric motors) can be used. Switched or synchronous reluctance electric motors or variable reluctance electric motors can also be used.

Each electric motor is comprised of a motor rotor 31A, 31B, which rotates integrally with the respective impeller 15A, 15B, and of a motor stator 33A, 33B, which is stationary with respect to the casing 3 of the turbomachine 1. As shown in FIGS. 1 and 2 the motor rotor 31A, 31B and the motor stator 33A, 33B of each embedded motor are arranged radially, as one surrounds the other. In the embodiment of FIGS. 1 and 2 the motor stator is arranged outside the motor rotor, i.e. the motor stator 33A, 33B surrounds the respective motor rotor 31A, 31B. As will be described later on, a reverse arrangement can also be envisaged, with the motor rotor surrounding the respective motor stator.

Figure 14:
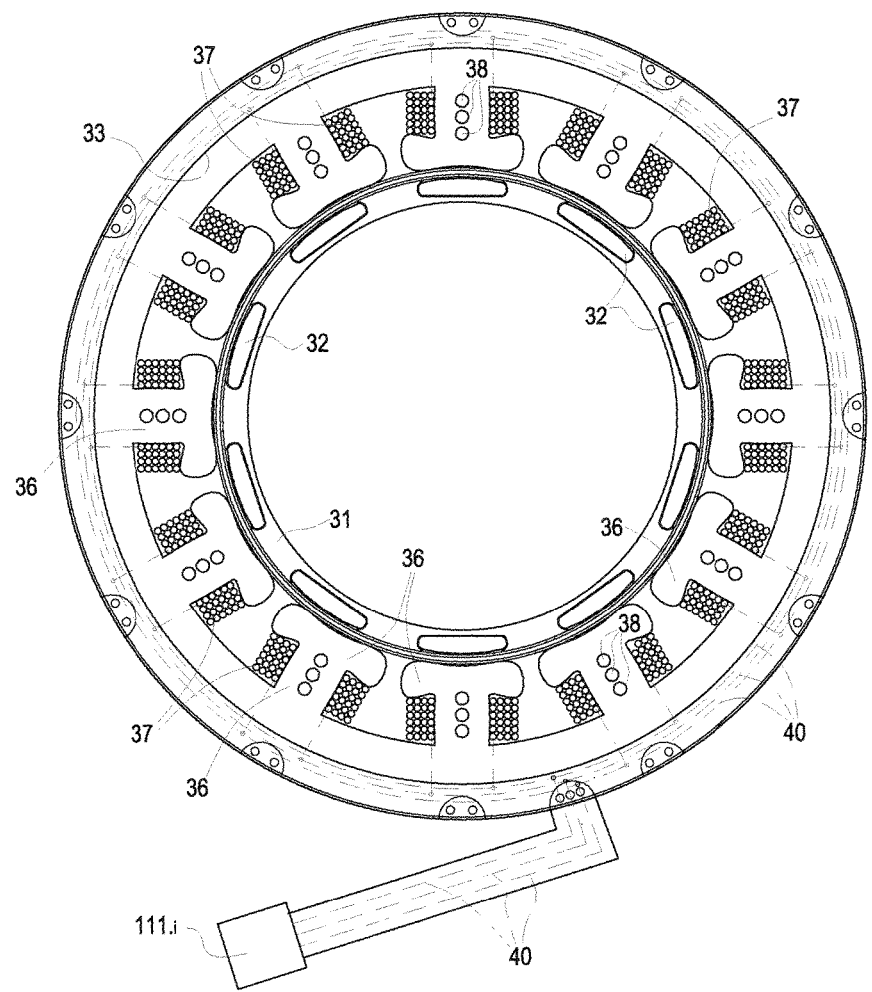
FIG. 14 illustrates a partial front view of a motor stator in accordance with embodiments of the present disclosure.
Figure 15:
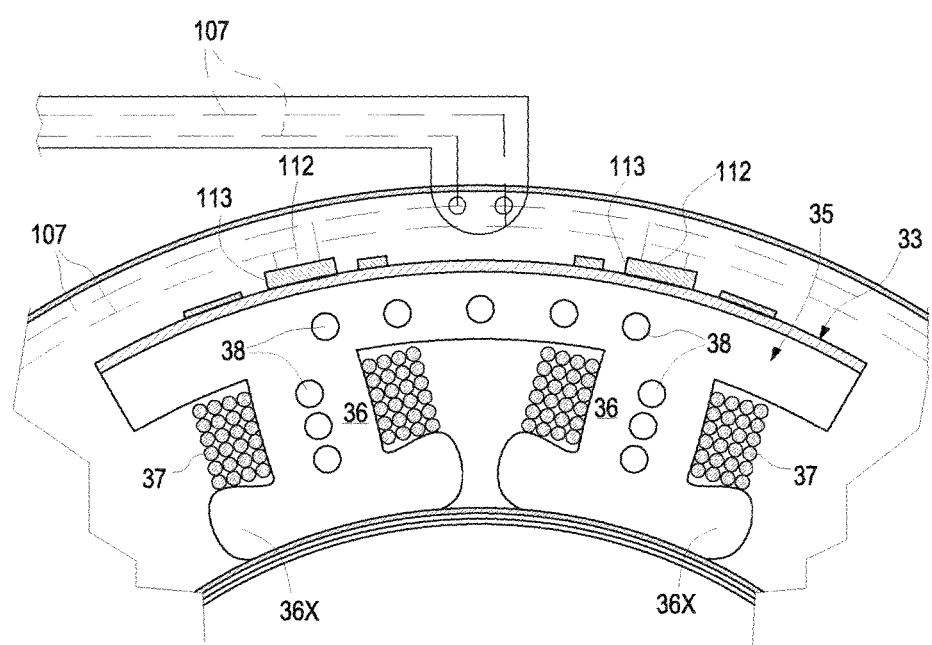
FIG. 15 illustrates a schematic front view of an embedded permanent magnet electric motor according to some embodiments of the subject matter disclosed herein.

In some embodiments, the motor rotor 31A, 31B can be housed in or partly formed by the shroud 19A, 19B of the respective impeller 15A, 15B and can be comprised of permanent magnets 32A, 32B. Each motor stator 33A, 33B includes a plurality of electromagnets formed by respective ferromagnetic cores or yokes 35A, 35B and electric coils 37A, 37B wound there around. According to some embodiments, as best shown in FIGS. 14 and 15, each yoke 35A, 35B of the motor stator 33A, 33B can include two radially extending arms 36 around which the electric coils 37A, 37B are wound. In the embodiment of FIGS. 1 and 2, the arms 36 are oriented radially inwardly and the ends thereof, which can be provided with respective expansions 36X (FIGS. 14, 15) are facing the respective motor rotor 31A, 31B. The yokes can be made of ferromagnetic material, e.g. stacked sheets of ferromagnetic metal. The yokes form a modular structure for the motor stator.

In an embodiment, the motor stators 33A, 33B can be isolated from the inner volume of the casing where the impellers 15A, 15B and the motor rotors 31A, 31B are arranged. For instance, a single liquid-tight annular housing 39 can be formed between the outer casing 3 and an inner sheath 41, the motor stators 33A, 33B being housed in the housing 39. In other embodiments, the motor stator 33A, 33B of each stage 13A, 13B can be liquid-tightly housed in a separate housing. In yet further embodiments, a plurality of liquid-tight housings can be provided, each housing two or more motor stators 33A, 33B of sequentially arranged stages 13A, 13B.

Additional further components and elements of the turbomachine and relevant embedded electric motors will be described in greater detail later on in connection with some exemplary embodiments.

Figure 3:
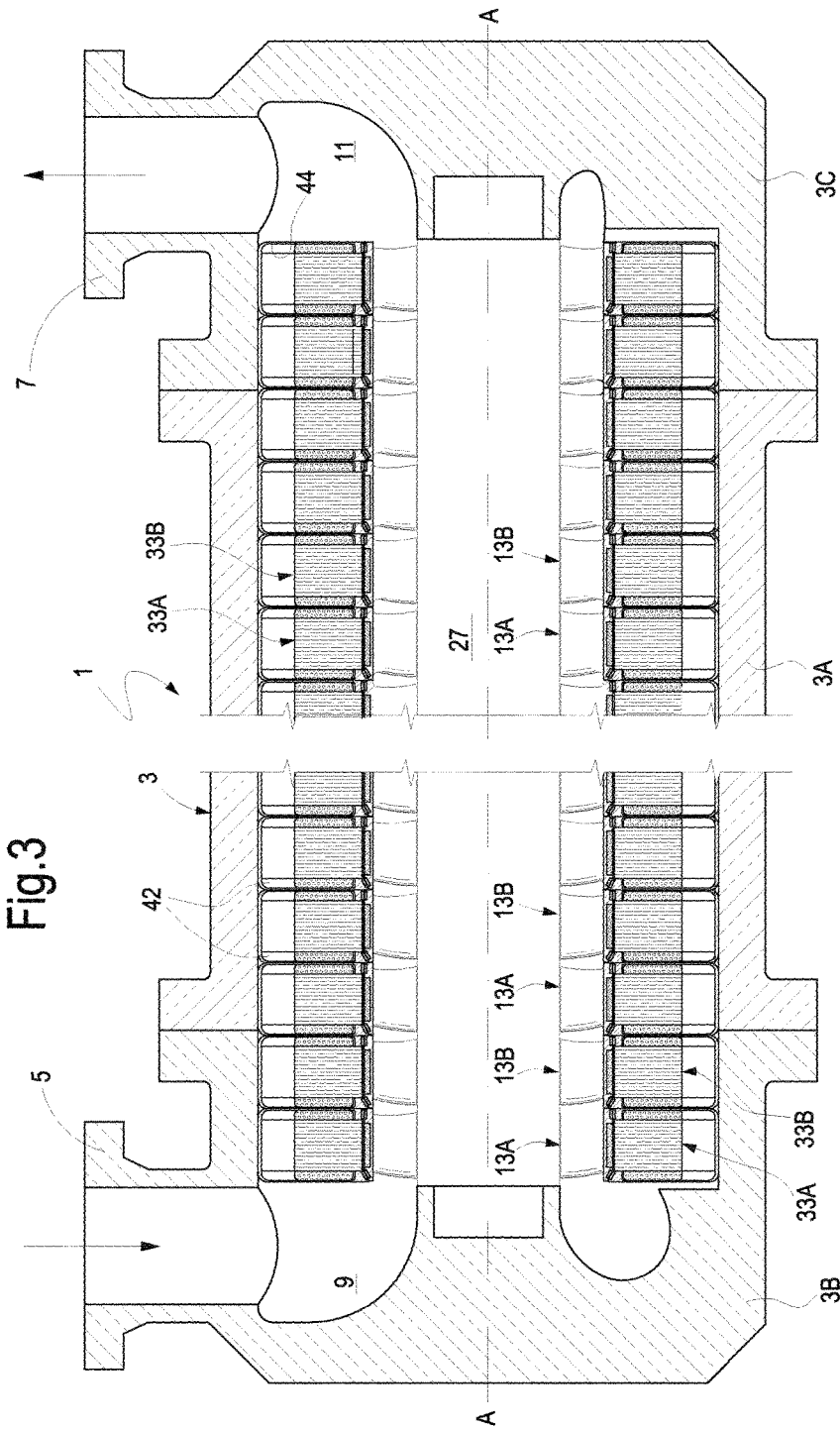
FIG. 3 illustrates an axial cross-section of a turbomachine in accordance with another embodiment of the present disclosure.
Figure 4:
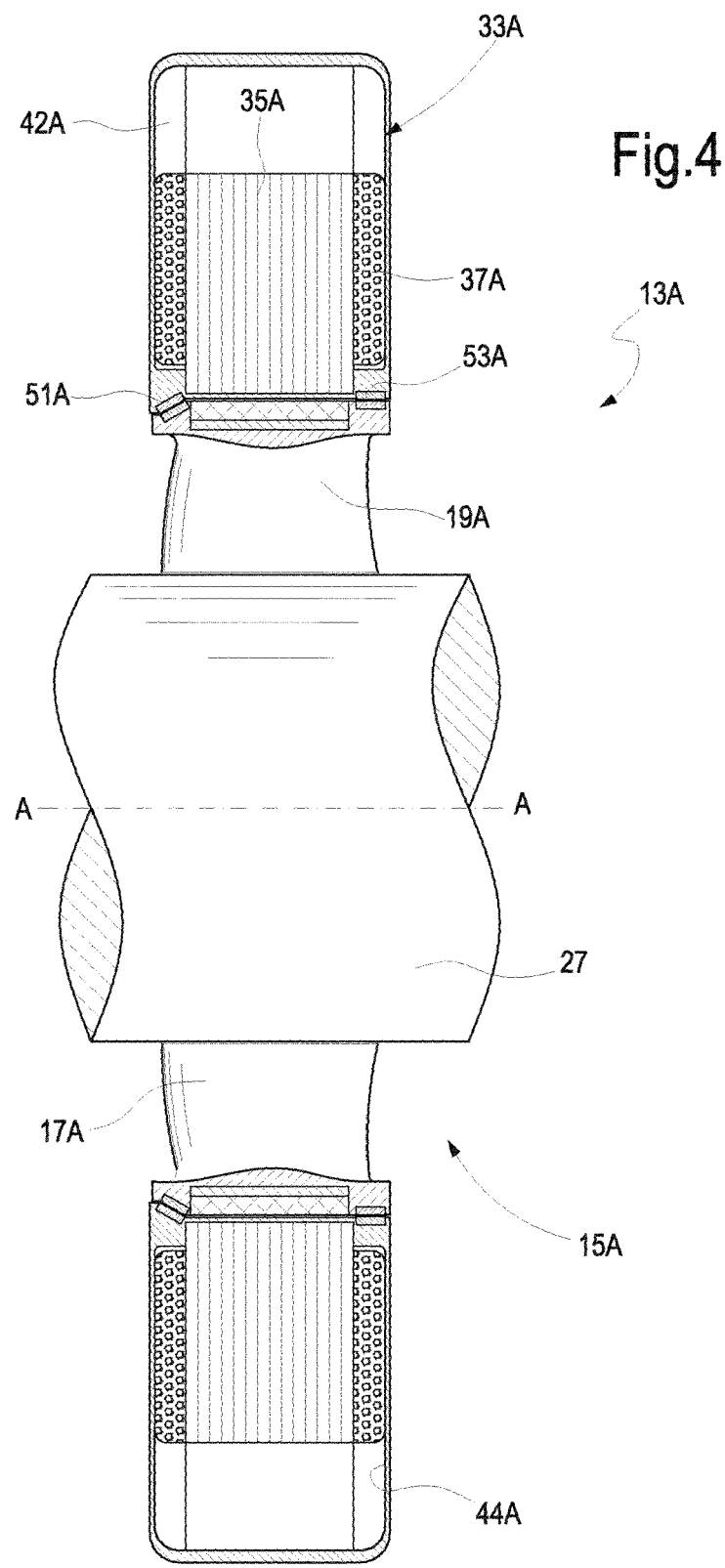
FIG. 4 illustrates an enlargement of FIG. 3.

FIG. 3 illustrates a cross-section according to a plane containing the rotation axis A-A of the turbomachine impellers, of a turbomachine 1 according to further exemplary embodiments of the present disclosure. FIG. 4 shows an enlargement of one stage of the turbomachine 1 according to the embodiment of FIG. 3. Same or corresponding components or elements as shown in FIGS. 1 and 2 are labeled with the same reference numbers.

According to FIGS. 3 and 4 the turbomachine 1 includes again a casing 3, comprised of three parts 3A, 3B and 3C. The casing 3 is provided with an inlet manifold 5 and an outlet manifold 7 and with an inlet plenum 9 and an outlet plenum 11. A plurality of stages 13A, 13B are sequentially arranged in the casing 3 from the inlet plenum 9 to the outlet plenum 11. Each stage 13A, 13B includes a respective impeller 15A, 15B with blades 17A, 17B. A central, stationary shaft 27 can be located in the casing 3 and extends through the stages 13A, 13B. Each stage 13A, 13B includes an embedded electric motor comprised of a motor stator 33A, 33B stationarily arranged in the casing 3 and a motor rotor 31A, 31B rotating integrally with and supported by the respective impeller 15A, 15B.

According to FIGS. 3 and 4 each impeller 15A, 15B can be supported at the outer periphery thereof by the respective motor stator 33A, 33B, through bearing arrangements 51A, 53A, 51B, 53B. The bearing arrangements 51A, 53A, 51B, 53B can be positioned between the outer shroud 19A, 19B of each impeller 15A, 15B and the interior of the motor stator 33A, 33B. For providing seats for the bearings, each motor stator 33A, 33B can be provided with its own housing 42, which can be closed by a sheath or envelope 44. The seats for outer rings or races of the bearing arrangements 51A, 53A; 51B, 53B can be formed in the inwardly facing surface of the sheaths 44. In some embodiments the bearing arrangements 51A, 53A, 51B, 53B can be cooled by the same fluid processed by the turbomachine 1.

Figure 5:
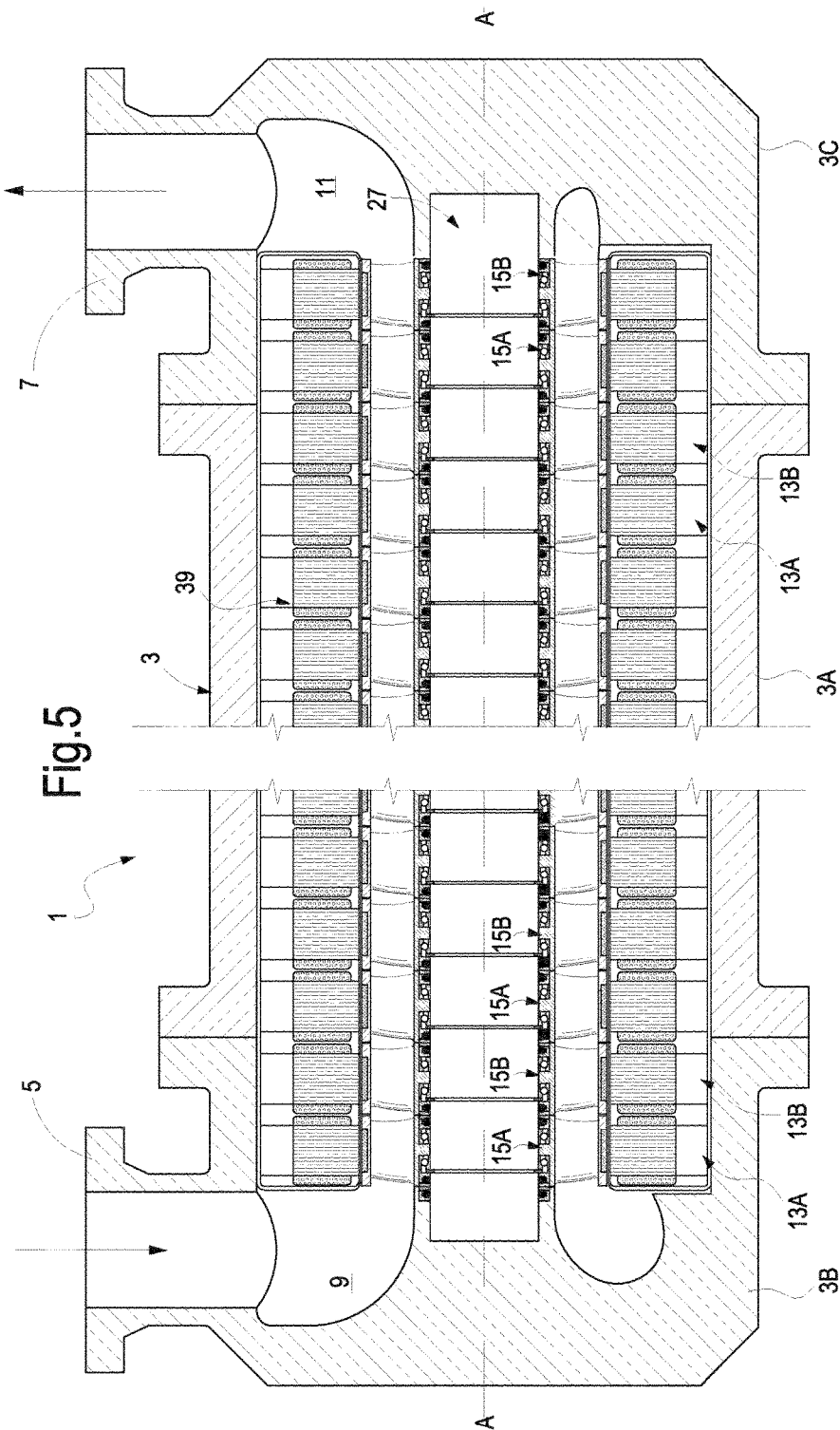
FIG. 5 illustrates an axial cross-section of a turbomachine in accordance with another embodiment of the present disclosure.
Figure 6:
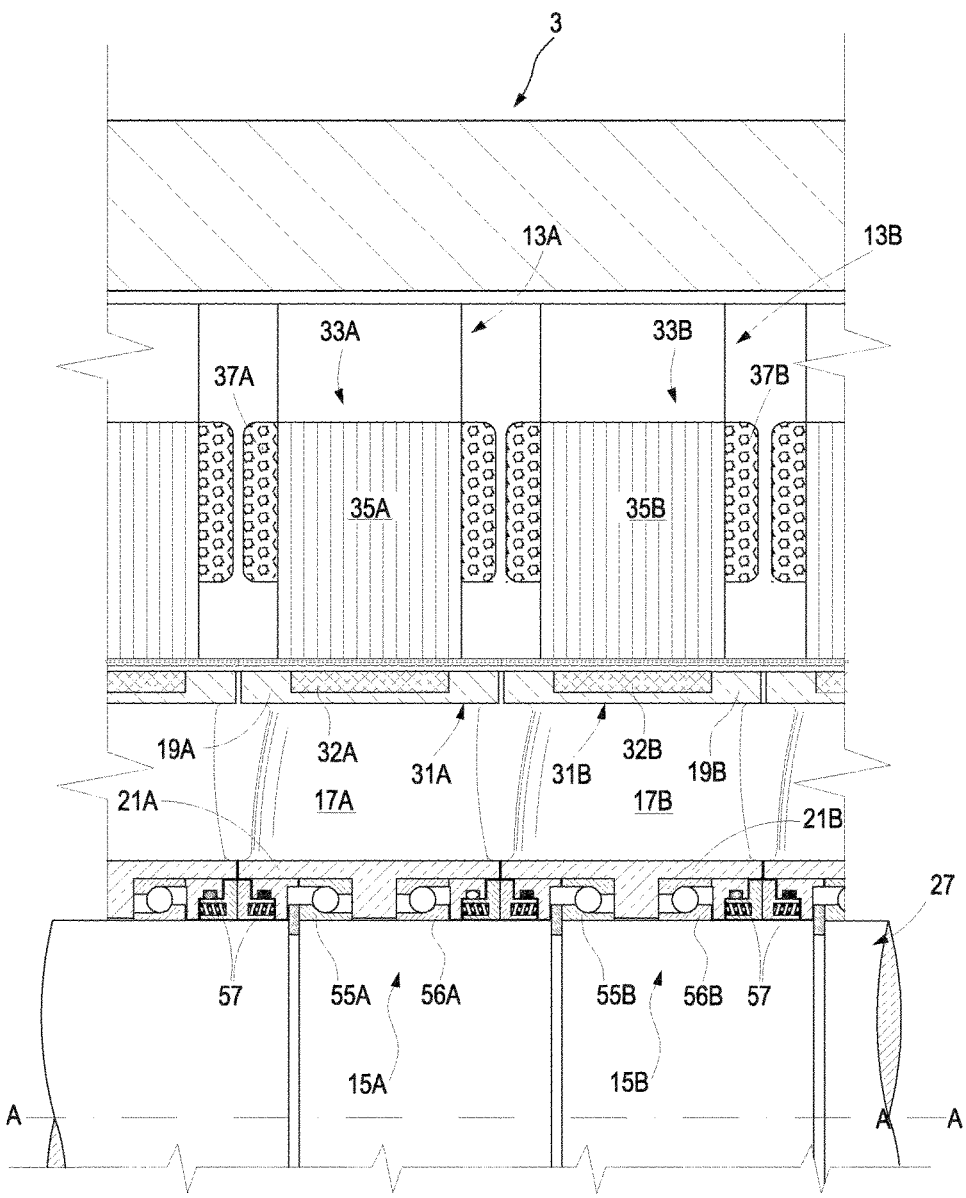
FIG. 6 illustrates an enlarged detail of FIG. 5.

FIGS. 5 and 6 illustrate a further embodiment of a turbomachine according to the present disclosure. The same reference numbers designate the same or corresponding parts or elements as in FIGS. 1 and 2. FIGS. 5 and 6 differ from FIGS. 1 and 2 in respect of the bearings used for supporting each impeller 15A, 15B. As best shown in the enlargement of FIG. 6, each impeller 15A, 15B is supported by rolling bearings 55A, 56A, 55B, 56B. In the exemplary embodiment shown in FIGS. 5 and 6 two opposite single-row angular-contact ball bearings are used to provide combined axial and radial loading capacity. Other bearing arrangements are possible, providing a combined axial and radial loading capacity e.g. with a different number of bearings and/or with a different kind or number of rolling members. A mechanical seal arrangement 57 can be provided for limiting or preventing leakages of process fluid towards the bearings.

Figure 7:
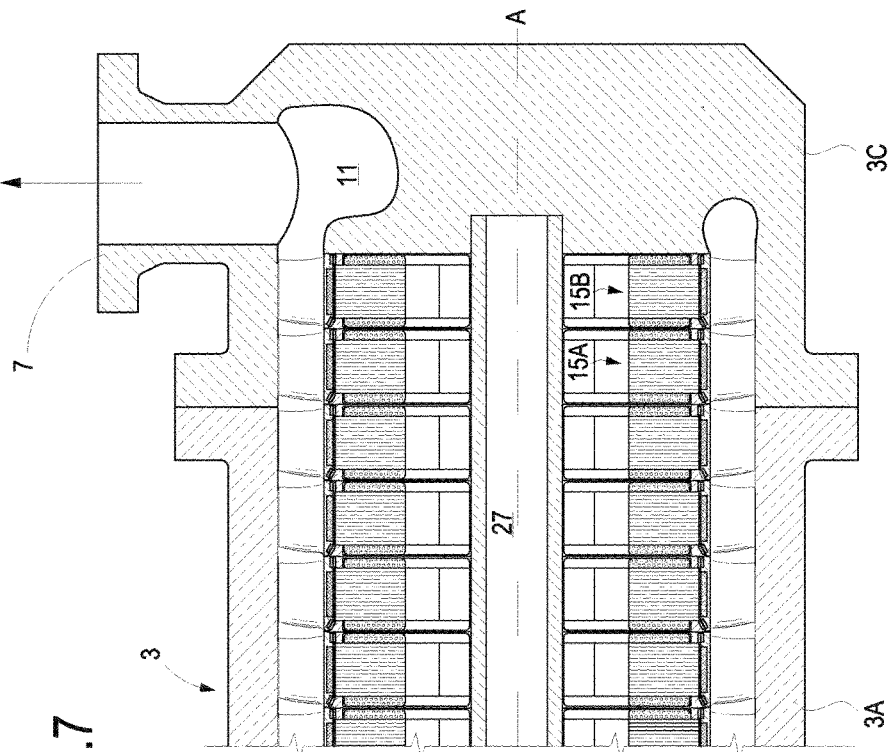
FIG. 7 illustrates an axial cross-section of a turbomachine in accordance with a further embodiment of the present disclosure.
Figure 8:
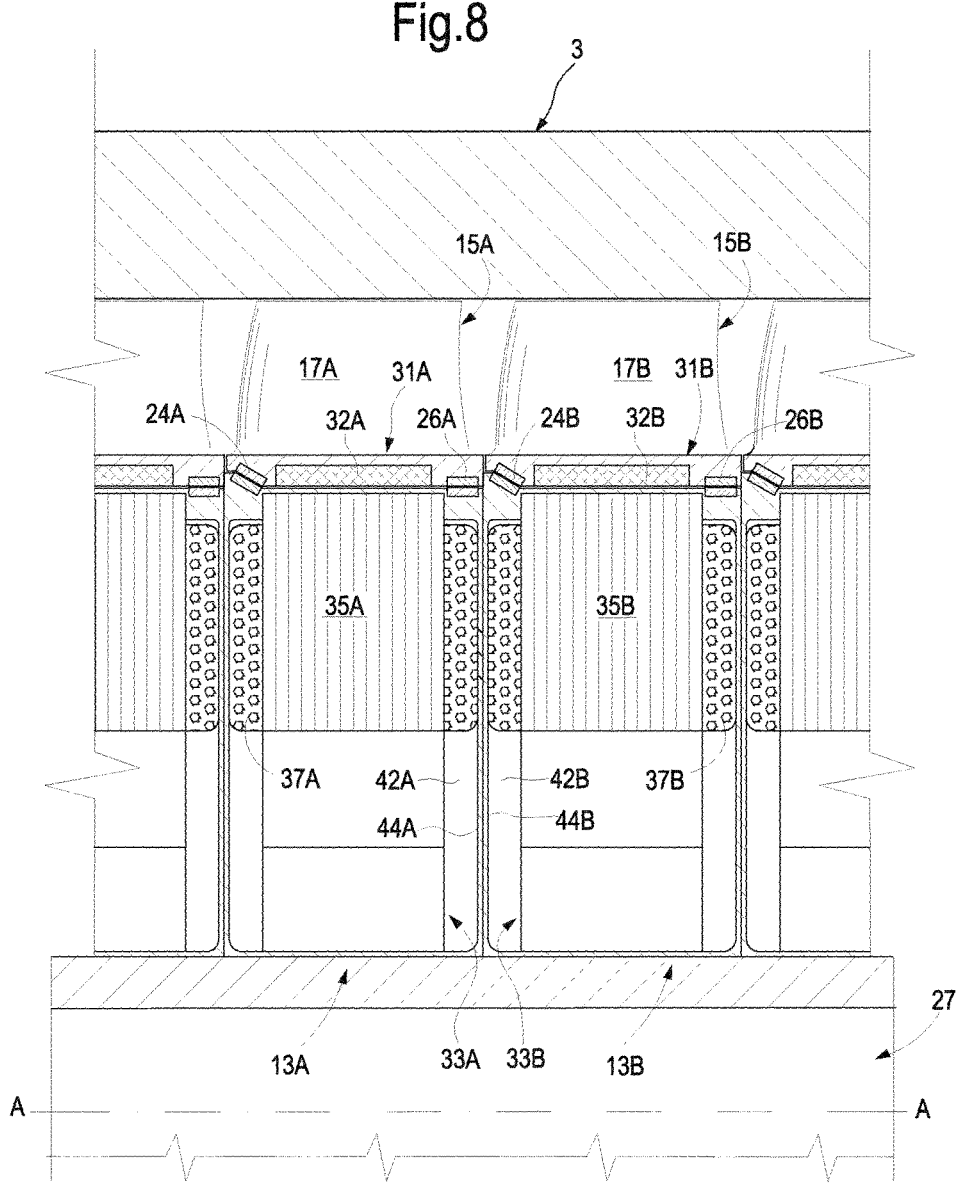
FIG. 8 illustrates an enlargement of a detail of FIG. 7.

FIGS. 7 and 8 illustrate a further exemplary embodiment of a turbomachine according to the present disclosure. The same reference numbers are used to designate components, parts and elements corresponding to those shown in FIGS. 1 to 6. In the embodiment of FIGS. 7 and 8 the arrangement of motor rotor and motor stator of each stage is reversed, the motor stator being located inside the motor rotor and the impeller surrounding the motor stator.

More specifically, the turbomachine 1 shown in FIGS. 7 and 8 includes an outer casing 3 provided with an inlet manifold 5 and an outlet manifold 7, which can be in fluid communication with an inlet plenum 9 and an outlet plenum 11, respectively. In the exemplary embodiment show in FIGS. 7 and 8 the turbomachine 1 is of the vertically-split type and is comprised of a central barrel 3A and two end portions 3B, 3C, together forming the casing 3. In other embodiments, not shown, the turbomachine can be of the horizontally-split type.

In FIGS. 7 and 8 the turbomachine is again represented as an axial turbomachine 1. The process fluid flows in a generally axial direction through the turbomachine 1 from the inlet plenum 9 towards the outlet plenum 11, across a plurality of stages, 13A, 13B. In some embodiments, the turbomachine 1 includes an even number of stages, arranged in pairs, each pair including a first stage 13A and a second stage 13B arranged in series and configured and controlled to rotate in opposite directions.

In some embodiments the turbomachine 1 can have an odd number of stages, in which case the first and last stage will have impellers rotating in the same direction. In an embodiment, however, the turbomachine 1 includes an even number of impellers.

As best shown in FIG. 8, with continuing reference to FIG. 7, each stage 13A, 13B includes an impeller 15A, 15B. The impellers 15A, 15B are provided with respective impeller blades 17A, 17B. Each impeller blade 17A, 17B can be comprised of a root portion, an airfoil portion ending with a tip at the radial outer end of the blade. The root portions of the annularly arranged blades 17A, 17B of each impeller 15A, 15B form an inner ring 22A, 22B. In some embodiments the inner ring 22A, 22B can be formed by a monolithic component.

Each stage 13A, 13B is driven into rotation by a respective embedded electric motor. Each electric motor is comprised of a motor rotor 31A, 31B and of a stationary motor stator 33A, 33B. The motor rotor 31A, 31B is formed on and rotates integrally with the respective impeller 15A, 15B. Differently from the previously described embodiments, in the turbomachine shown in FIGS. 7 and 8 each embedded electric motor is located inside the annular blade arrangement 17A, 17B, the motor stator 33A, 33B is located inside the motor rotor.

In some embodiments, the motor rotor 31A, 31B can be housed in or partly formed by the inner ring 22A, 22B of the respective impeller 15A, 15B and can be comprised of permanent magnets 32A, 32B. In other embodiments, where a variable reluctance electric motor or a switching reluctance electric motor is used instead of a permanent magnet electric motor, the inner ring 22A, 22B of each impeller can be formed by ferromagnetic material with magnetic flux barriers.

Each motor stator 33A, 33B is stationarily arranged in the casing 3 inside the respective motor rotor. The motor stators 33A, 33B can be stationarily supported by a central stationary, i.e. non-rotating shaft 27. Each motor stator 33A, 33B includes a plurality of electromagnets formed by respective ferromagnetic cores or yokes 35A, 35B and electric coils 37A, 37B wound there around. Each yoke can be provided with one or more radially outwardly extending arms, around which the coils 37A, 37B are wound.

In some embodiments each impeller 15A, 15B is supported by respective bearing arrangements 24A, 26A and 24B, 26B on the motor stator 33A, 33B of the respective embedded electric motor. As schematically shown in FIG. 8 the bearing arrangements 24A, 26A and 24B, 26B can have a combined radial loading and axial loading capacity, i.e. they can support both axial and radial loads.

Each impeller 15A, 15B can rotate around the rotation axis A-A with a rotary speed which is different from the speed of the adjacent impeller, as far as speed direction and/or module are concerned.

In an embodiment, the motor stators 33A, 33B are isolated from the interior of the casing 3 where the impellers 15A, 15B are arranged. For better mounting of the bearing arrangements 24A, 26A, 24B, 26B, each motor stator 33A, 33B can be enclosed in an individual closure or sheath, on the outer surface whereof seats for the bearings are formed. In FIG. 8 the sheaths are labeled 44A, 44B and the inner seat formed thereby and housing the respective motor stator 33A, 33B is labeled 42A, 42B. In an embodiment, each seat is liquid-tight for preventing leakage of the process fluid into the seats 42A, 42B of the motor stators 33A, 33B.

Figure 9:
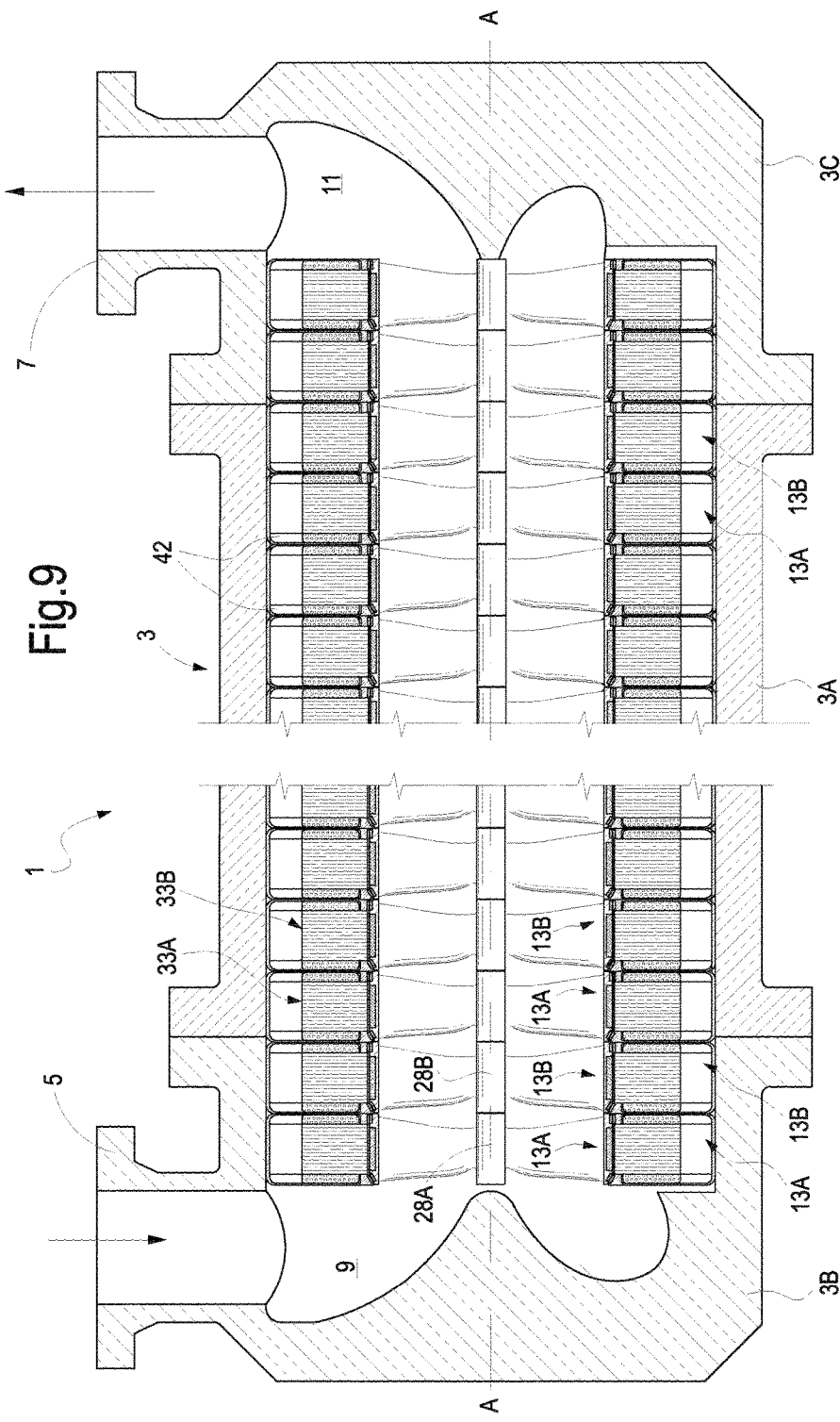
FIG. 9 illustrates an axial cross-section of a turbomachine in accordance with a further embodiment of the present disclosure.
Figure 10:
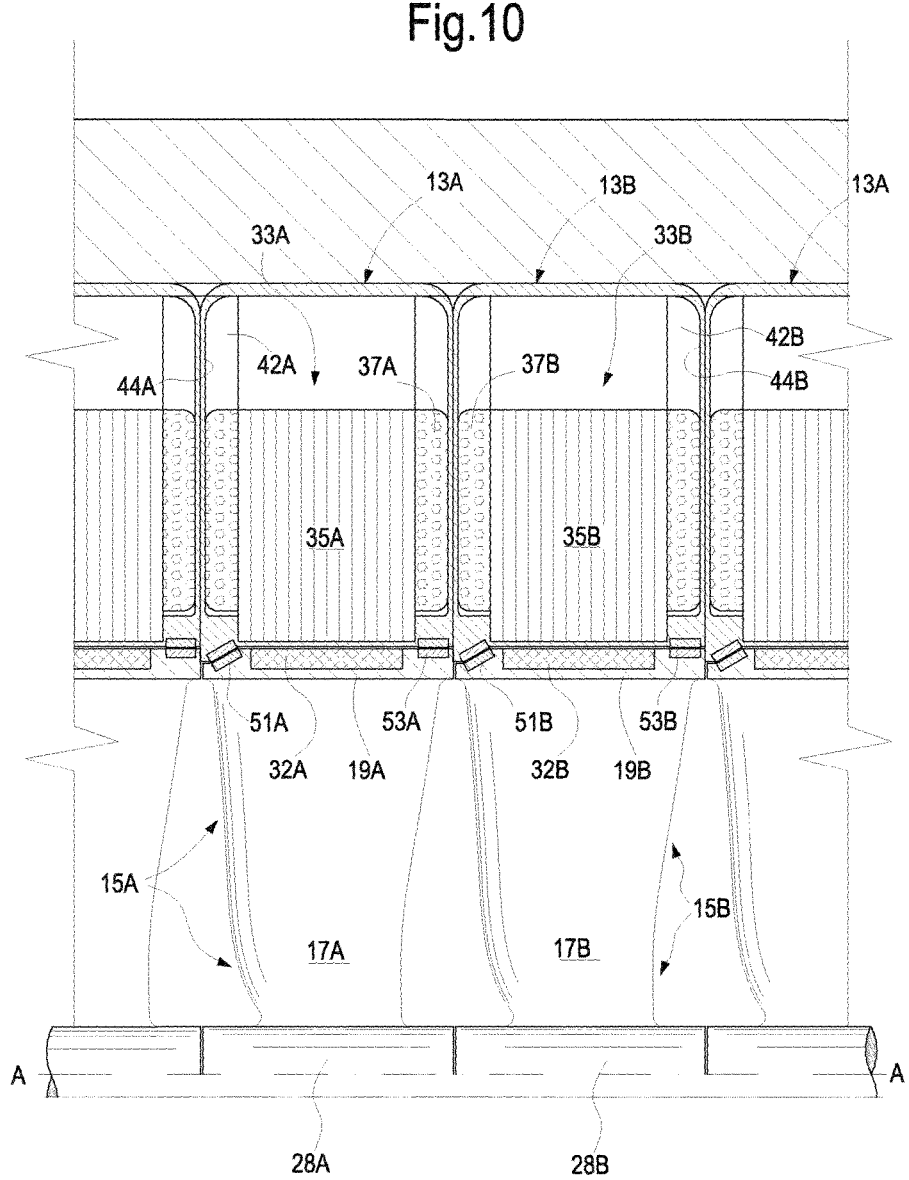
FIG. 10 illustrates an enlarged detail of FIG. 9.

FIGS. 9 and 10 illustrate a further embodiment of a turbomachine according to the technique disclosed herein. Similar or equivalent parts and components are labeled with the same reference numbers as in the figures described here above. The turbomachine 1 of FIGS. 9 and 10 is a generally axial machine having a casing 3 with an inlet manifold 5 and an outlet manifold 7. The turbomachine 1 can be further comprised of an inlet plenum 9 in fluid communication with the inlet manifold 5 and an outlet plenum 11 in fluid communication with the outlet manifold 7. The process fluid flows in a generally axial direction through the turbomachine from the inlet plenum 9 towards the outlet plenum 11, across a plurality of stages, 13A, 13B arranged in sequence.

Each stage 13A, 13B includes a rotating impeller 15A, 15B, driven into rotation by a respective embedded motor comprised of a motor rotor 31A, 31B rotating integrally with a respective impeller 15A, 15B, and a motor stator 33A, 33B, stationarily arranged in the casing 3. In the embodiment of FIGS. 9 and 10 the motor stator 33A, 33B of each stage 13A, 13B is located radially outwardly with respect to the impeller 15A, 15B and surrounds the respective motor rotor 31A, 31B.

In an embodiment, an even number of stages 13A, 13B is provided and the stages are paired, the impellers of two sequentially arranged stages of each pair being counter-rotating, i.e. they are configured and controlled for rotating in two opposite directions, clockwise and counter-clockwise respectively. As in the previously described embodiments, the speed of the embedded motors and thus of the stages can be controlled independently of one another, such that the rotary speed of each stage can be optimized, according to control methods which will be described in greater detail later on.

Each impeller 15A, 15B is provided with respective impeller blades 17A, 17B arranged in a circle or annular arrangement. Each impeller blade 17A, 17B can be provided with a root portion, an airfoil portion and a tip portion. The tip portions of the annularly arranged blades 17A, 17B of each impeller 15A, 15B form an outer ring or shroud 19A, 19B. In some embodiments the ring or shroud 19A, 19B can be formed by a monolithic component. In an embodiment, the motor rotor of each stage is formed in or supported by the outer shroud of the respective impeller 15A, 15B. The motor rotor 31A, 31B can include permanent magnets 32A, 32B, co-acting with electromagnets forming the motor stator 33A, 33B. For example, the permanent magnets 32A, 32B can be embedded in the outer annular portion of the shroud 19A, 19B of the respective impeller 15A, 15B.

The root portions of each set of blades of each impeller 15A, 15B can form a monolithic central core 28A, 28B.

Similarly to the embodiment depicted in FIGS. 3 and 4, each impeller 15A, 15B can be supported at the outer periphery thereof by the respective motor stator 33A, 33B, through a bearing arrangement 51A, 53A, 51B, 53B. The bearing arrangement can have an axial loading and radial loading capacity.

The bearing arrangements 51A, 53A, 51B, 53B can be positioned between the outer shroud 19A, 19B of each impeller 15A, 15B and the interior of the motor stator 33A, 33B. Each motor stator 33A, 33B can be housed in a respective housing 42 bounded for instance by a sheath 44, which separates the motor stator 33A, 33B from the surrounding environment. Seats for outer rings or races of the bearing arrangements 51A, 53A; 51B, 53B can be formed in the inwardly facing surface of the sheaths 44. In some embodiments the bearing arrangements 51A, 53A, 51B, 53B can be lubricated and cooled by the same fluid processed by the turbomachine 1.

The previously described embodiments relate to axial turbomachines. Other embodiments of the technique disclosed herein can include radial turbomachine or mixed axial and radial turbomachine arrangements.

Figure 11:
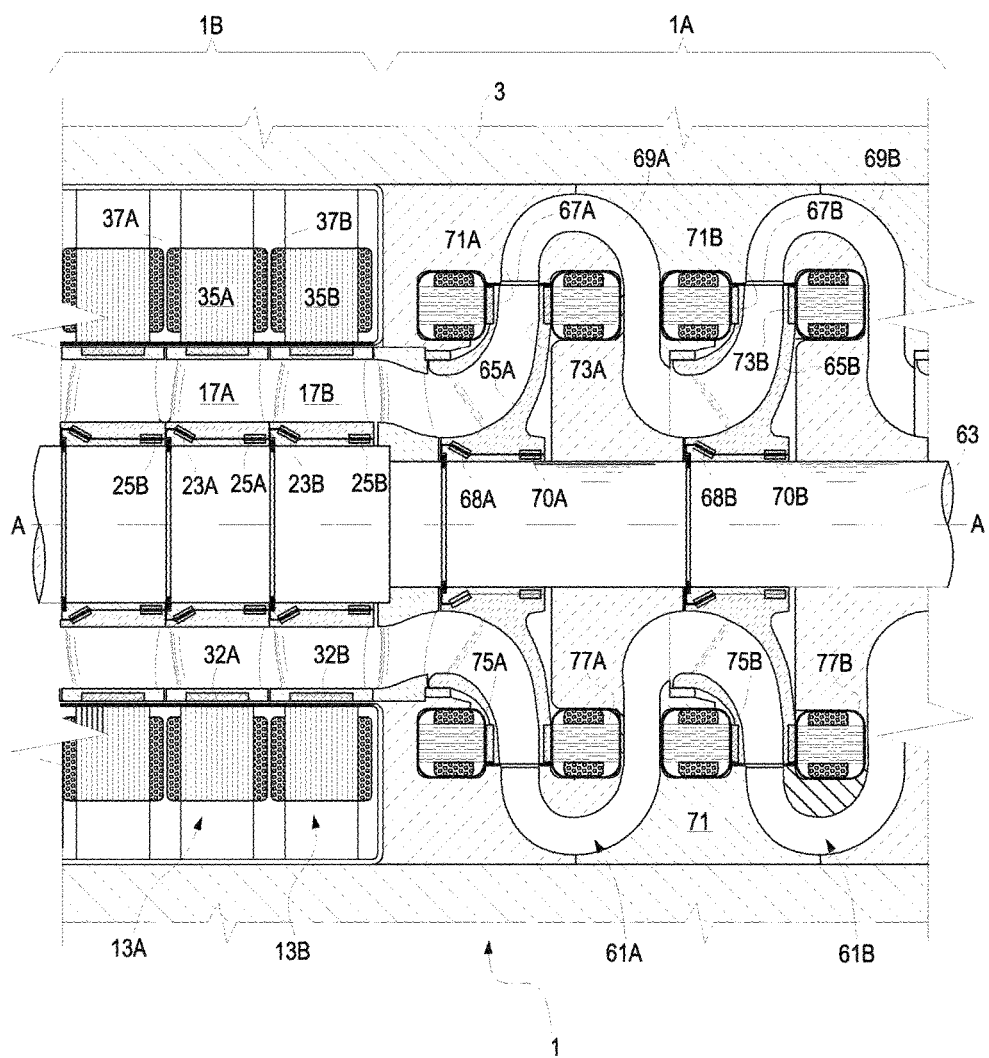
FIG. 11 illustrates an axial-cross section of an exemplary embodiment of a mixed axial and radial turbomachine according to the present disclosure.

FIG. 11 illustrates an exemplary embodiment of a mixed axial and radial turbomachine according to the present disclosure. As shown in FIG. 11 a mixed axial and radial turbomachine, globally labeled 1, can be comprised of a first machine section 1A and a second machine section 1B arranged in sequence between an inlet manifold and an outlet manifold, not shown.

In the embodiment shown in FIG. 11 the first machine section 1A has a plurality of axial stages. Each stage can be designed as described above in connection with any one of FIGS. 1 to 10. In the exemplary embodiment of FIG. 11 the axial stages are designed in the same way as the stages of the turbomachine 1 of FIGS. 1 and 2. The same reference numbers are used to designate the same or corresponding parts and elements, which will not be described again. In other embodiments, the first turbomachine section 1A can include stages designed according to the embodiments illustrated in FIGS. 3 to 10.

The second machine section 1B can be comprised of a plurality of radial or mixed stages. It shall be understood that in the context of the present description and attached claims, when referred to the turbomachine the terms axial and radial refer to the direction of flow through the machine. As noted above in connection with FIGS. 1 through 10, the arrangement of the motor rotor and motor stator of the embedded motor of a stage in an axial machine are radially arranged, i.e. placed one radially inside the other. This occurs also in the section 1A of the mixed turbomachine of FIG. 11. Conversely, in the section 1B of the mixed turbomachine of FIG. 11, where the flow is radial, e.g. centrifugal, the embedded electric motor of each centrifugal stage is arranged axially, in the sense that the motor stator(s) and the motor rotor are aligned along the axis of rotation of the turbomachine.

In the partial view of FIG. 11 only three axial stages in the machine section 1A and two radial stages in the machine section 1B are shown, but those skilled in the art will understand that a different number of stages can be provided in each two machine section 1A and 1B. Between the two sections one possible embodiment includes a stationary section to condition the flow direction before entering the following stage. Flow-redirecting members of the stationary flow-conditioning section can include stationary blades as shown e.g. at 66 in FIG. 11.

The two radial stages shown in FIG. 11 are labeled 61A and 61B. A stationary shaft 63 can extend through the turbomachine and support the rotary stages of both machine sections 1A and 1B. In some embodiments the stages 61A, 61B of the machine section 1B can be identical or similar. Each stage includes a respective impeller 65A, 65B. According to some embodiments the stages impellers 65A, 65B rotate in the same direction. Arrangements with counter-rotating impellers can also be foreseen. According to some embodiments, the rotary speed of each stage 61A, 61B can be controlled independently of the other stage(s), so that each stage can rotate at its own speed.

The shaft 63 can be monolithic. In other embodiments the shaft 63 can be formed by two or more shaft portions arranged in sequence and substantially coaxial to one another. Each impeller 65A, 65B is rotatingly mounted on the shaft 63.

Each impeller 65A, 65B includes a set of blades 67A, 67B defining flow channels extending from an impeller inlet to an impeller outlet. Each stage 61A, 61B can further include a respective return channel 69A, 69B, which extends from the outlet of the respective impeller towards the inlet of the subsequent impeller. The return channels 69A, 69B can be formed in a stationary diaphragm 71 arranged in the casing 3 of the turbomachine 1.

Each impeller 65A, 65B can be rotatingly supported on the stationary shaft 63 by means of respective bearing arrangements 68A, 70A and 68B, 70B, having an axial loading and radial loading capacity. The bearings can be lubricated and cooled with the liquid part of the process fluid flowing through the turbomachine. In other embodiments the bearings can be rolling bearings provided with sealing arrangements, preventing process liquid leakages inside the bearings, as described e.g. in connection with FIGS. 5 and 6.

In some embodiments, each stage 61A, 61B of the machine section 1B can be provided with a respective embedded electric motor housed in the casing 3. Each embedded electric motor can be a PM electric motor or a variable reluctance motor. In the embodiment illustrated in FIG. 11 the embedded electric motor is a PM motor.

In some embodiments each electric motor can include a motor rotor supported by or formed in the respective impeller 65A, 65B, which co-acts with a motor stator. In the embodiment illustrated in FIG. 11, each electric motor includes a motor rotor comprised of permanent magnets 71A, 73A and 71B, 73B arranged along two annular regions of the relevant impeller 61A, 61B. In other embodiments, a single set of annularly arranged permanent magnets can be provided. In an embodiment, the permanent magnets are arranged near the outlet of the relevant impeller, i.e at the trailing edges of the impeller blades 67A, 67B.

Each motor stator can include a plurality of electromagnets mounted stationarily in the machine casing, e.g. supported by or integrated in the diaphragm 71 and co-acting with the permanent magnets 71A, 73A, 71B, 73B. The electromagnets are arranged so as to face the respective set of annularly arranged permanent magnets 71A, 73A, 71B, 73B. In the embodiment illustrated in FIG. 11, each motor stator includes two sets of annularly arranged electromagnets, labeled 75A, 77A and 75B, 77B for the two stages 61A, 61B, respectively. Each set of electromagnets co-acts with one set of the respective permanent magnets 71A, 73A and 71B, 73B.

Similarly to the motor stators of the axial stages described above, the electromagnets of the motor stators 75A, 77A, 75B, 77B can include a set of ferromagnetic yokes and relevant conductor coils formed there around.

As previously mentioned, the bearings of the turbomachine can be lubricated and cooled by means of the liquid part of the same fluid being processed by the turbomachine 1. In general, the fluid is a multi-phase fluid, e.g. a mixture of gaseous and liquid hydrocarbons. The gaseous fraction of the fluid can be used to reduce the friction in the gap between the motor stator and the motor rotor of the embedded electric motors of the machine stages.

As the gas volume fraction percentage (herein also shortly indicated as GVF %) can vary during operation of the machine, situations may arise where the percentage of liquid is insufficient to ensure proper lubrication and/or cooling of the bearing arrangements supporting the rotors of the embedded electric motors. On the opposite side there are operating conditions that may bring liquid with very high viscosity in the gap between electric motor stator and rotor thus increasing the friction losses.

According to some embodiments, in order to optimize the amount of gas and/or liquid for optimum friction reduction in the motor gap or bearing lubrication and cooling, a gas/liquid separator can be arranged at the outlet of the turbomachine 1, for the purpose of recirculating a portion of the gaseous fraction of the multiphase fluid, e.g. when the GVF % of the fluid being processed is particularly low, and/or for recirculating a portion of the liquid fraction when the GVF % is particularly high.

Figure 12:
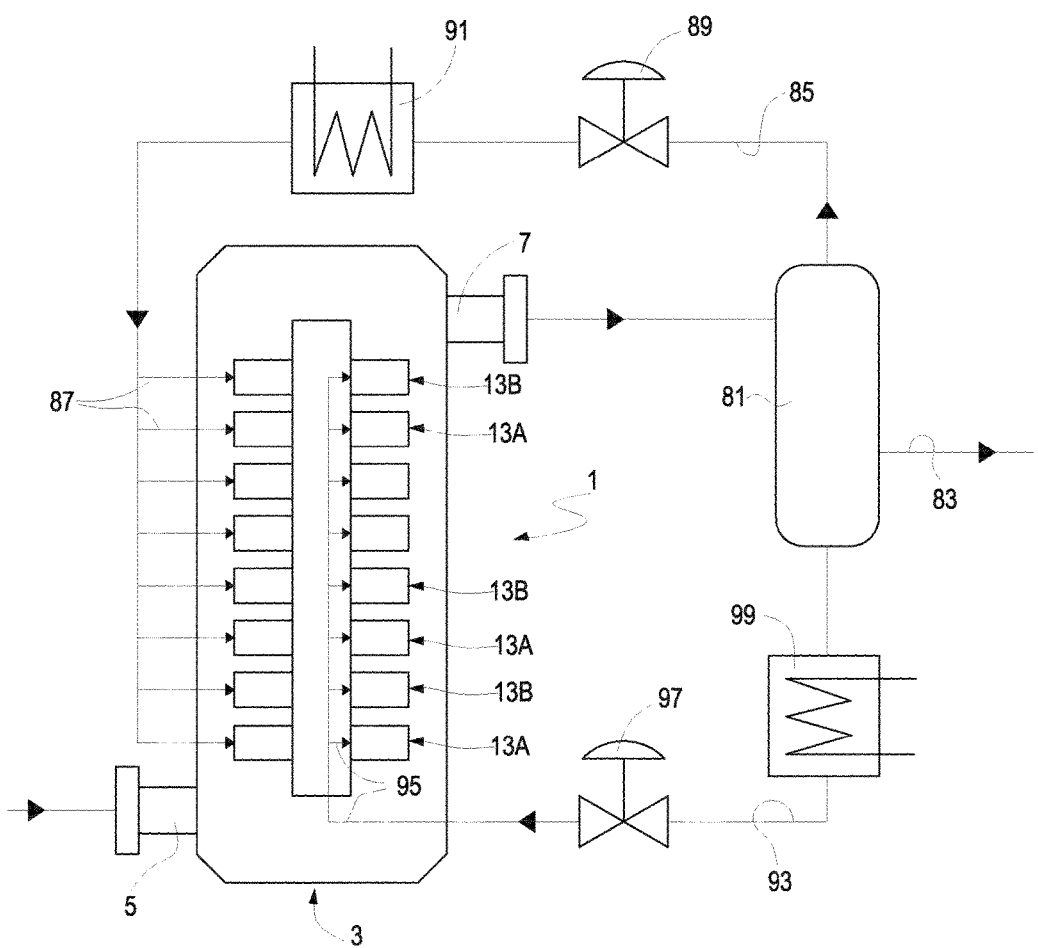
FIG. 12 illustrates a schematic diagram of a turbomachine of the present disclosure provided with a liquid/gas separator downstream thereof.

In some exemplary embodiment, as illustrated in FIG. 12 with continuing reference to FIGS. 1 to 11, the turbomachine 1 is provided with a liquid/gas separator 81 arranged downstream of the outlet manifold 7 of the turbomachine 1. The liquid/gas separator 81 is configured for separating at least part of the gas fraction and/or part of the liquid fraction from the main flow delivered through a delivery duct 80 by the turbomachine 1. The main flow exits the separator 81 through a main duct 83. A first gas flow recirculating duct 85 can be provided between the liquid/gas separator 81 and the turbomachine 1, in fluid communication with the embedded electric motors of the turbomachine. Gas distribution passages 87 can be arranged and configured for distributing the recirculated gas from the gas flow recirculating duct 85 towards the gaps between the motor stator 33A, 33B and the motor rotor 31A, 31B of the various stages 13A, 13B of the turbomachine 1.

A gas recirculating valve 89 can be arranged along the gas recirculating duct 85, for controlling gas recirculation from the gas/liquid separator 81 towards the turbomachine 1. A plurality of valves in series (not shown) can distribute the flow at different pressure levels along the machine.

A heat exchanger 91 can further be provided along the gas recirculating duct 85, for cooling the recirculating gas flow. The gas recirculating valve 89, or any other control arrangement, can be used to control the gas recirculation so that if the gas volume fraction in the fluid flow processed by the turbomachine 1 is insufficient to for suitable friction control in the gap of the electric motors, the amount of gas in the gaps can be increased through gas recirculation.

Alternatively or in combination, a liquid recirculating duct 93 can be provided between the gas/liquid separator 81 and a liquid distribution arrangement 95, for recirculating at least a portion of the liquid from the gas/liquid separator 81 towards the bearings of the machine stages 13A, 13B, when the processed fluid has a liquid volume fraction (i.e. liquid content), which is insufficient to achieve proper bearing lubrication and cooling. A control valve 97 can be provided for controlling the recirculating liquid flow. A plurality of valves arranged in series can distribute the flow at different pressure levels along the machine. In some embodiments, a heat exchanger 99 can also be provided along the liquid recirculating duct 93, for cooling the liquid before the latter is fed to the bearings.

Figure 13:
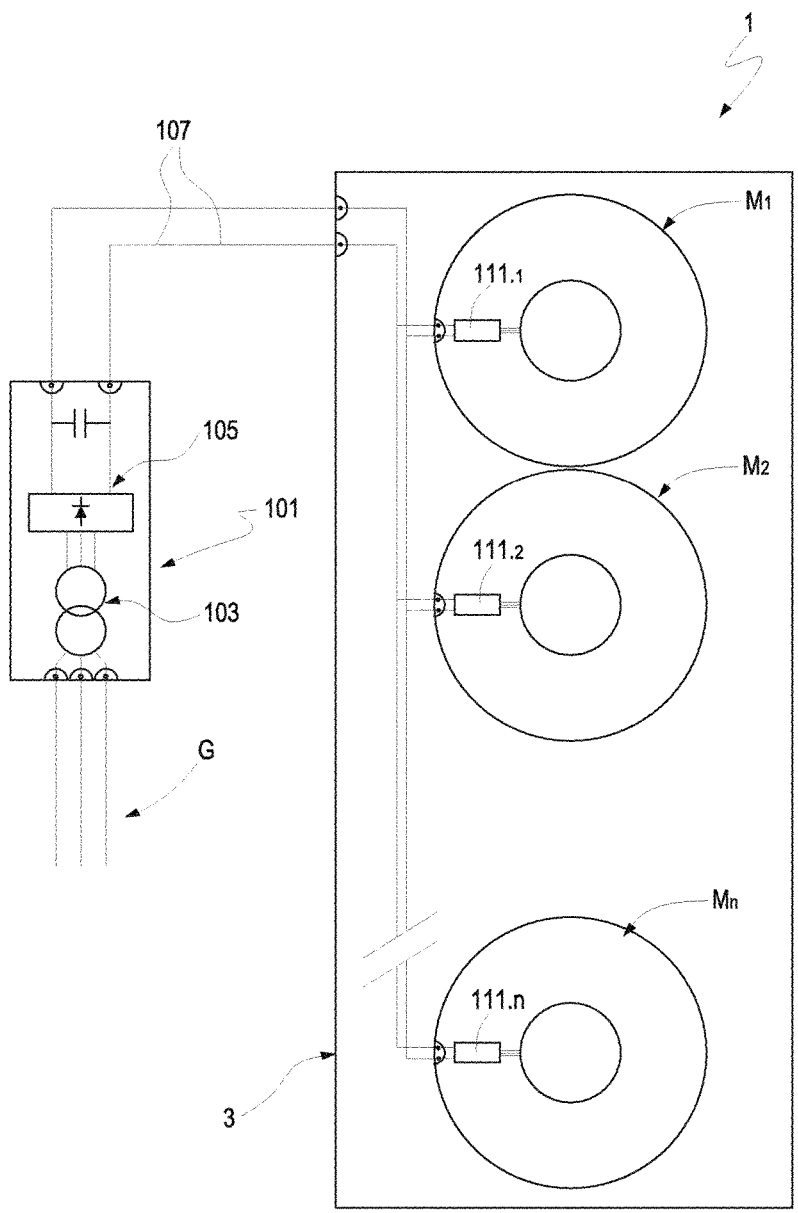
FIG. 13 illustrates a schematic diagram of the electric powering of a turbomachine in accordance with embodiments of the present disclosure.

In some embodiments, as illustrated in FIG. 13 with continuing reference to FIGS. 1 to 12, the turbomachine 1 can be powered through an electric power delivery arrangement 101, which can be external to the casing 3 and in electric communication with the embedded electric motors of the stages 13A, 13B of turbomachine 1.

In the schematic representation of FIG. 13, the electric power delivery arrangement 101 can be connected to an electric power distribution grid G, e.g. a three-phase electric power distribution grid. The electric power delivery arrangement 101 can be comprised of a transformer schematically shown at 103 and a rectifier schematically shown at 105. Electric wires 107 can enter the casing 3 of the turbomachine 1 and be connected to each embedded motor of the various stages 13A, 13B. In the schematic representation of FIG. 13 the embedded motors are represented only schematically and labeled M1 through Mn for an n-stage turbomachine 1. In an embodiment, each embedded motor M1-Mn, which in turn includes a motor rotor 31A, 31B and a motor stator 33A, 33B as described here above in connection with FIGS. 1 to 11, can include a power control circuit schematically shown at 111.1 through 111.$n$ in the schematic of FIG. 13. Each power control circuit 111.1 through 111.$n$ can be a high-frequency power control, capable of controlling the rotary speed of each embedded motor M1-Mn separately according to a suitable control algorithm.

FIG. 14 illustrates a schematic cross-sectional view of an electric motor of one of the turbomachine stages 13A or 13B. As shown in FIG. 14, with continuing reference to FIGS. 1 to 13, the electric motor includes a motor stator 33, which can represent any one of stators 33A, 33B, and a motor rotor 31, which can be any one of motor rotors 31A, 31B. The motor rotor includes a plurality of permanent magnets 32, which can be any one of permanent magnets 32A, 32B as described above. The motor stator 33 can be comprised of a plurality of modular yokes 35, each of which can be any one of yokes 35A, 35B and comprised of ferromagnetic arms or expansions 36, facing the motor rotor 31. Each arm 36 is surrounded by an electric coil 37, corresponding to any one of coils 37A, 37B. A wiring 40 is arranged around the stator to power the coils 37. The wiring 40 of the generic electric motor $i^{th}$ can be connected to the respective power control circuit 111.$i$ as shown in FIG. 13. In the example as shown in FIG. 14, the wiring 40 has a plurality of wires, each representing a phase of the powering system. The coils 37 are electrically connected to the phases of the wiring 40 so that subsequently arranged coils are connected to different phases, as known to those skilled in the art, thus powering the coils in sequence and causing the motor rotor 31 to rotate, following the rotation of the magnetic field generated by the coils.

According to other embodiments, separate control circuits can be provided for each yoke of the stator, rather than a single power control unit and a multi-phase wiring 40. FIG. 15 illustrates an exemplary embodiment wherein each yoke is provided with its own power control circuit. In FIG. 15 a portion of one of the electric motors of the stages 13A, 13B is shown in a cross sectional view. The same reference numbers as in FIGS. 13 and 14 are used to designate the same or corresponding parts or components. In FIG. 15 the electric power from the rectifier 105 is delivered through electric wires 107 to the interior of the motor stator 33. The motor rotor has been omitted in FIG. 15 for the sake of simplicity. The motor stator 33 can be comprised of a plurality of modular components, each comprised of a yoke 35 having electromagnetic arms 36 extending radially towards the motor rotor and provided with expansions 36X. A coil 37 is wound around each arm 36. Each coil 37, which can be any one of coils 37A, 37B, is electrically powered by an embedded power control circuit 111. Each embedded power control circuit 111 is connected to the wires 107 and is controlled so that the coils are powered in sequence, generating a torque on the motor rotor 31.

In both embodiments of FIGS. 14 and 15 a cooling channeling 38 is shown, where through a cooling medium, more particularly a cooling liquid, can be circulated to remove heat from the motor stator of each embedded electric motor.

In order to correctly synchronize the circumferentially arranged coils 37 of each motor stator so that torque is generated on the corresponding motor rotor, the angular position of the respective motor rotor must be known. This can be detected by a sensor, such as a Hall sensor. Alternatively, one or more coils 37 can be used to sense the angular position of the rotor. In this case, a separate sensor can be dispensed with. Additional details on how the coils of a motor stator in a PM electric motor can be used to provide information on the angular position of the motor rotor for controlling the powering of the stator coils are disclosed e.g. in EP 2369721 and other publications of the same patent family, the content whereof is incorporated herein by reference. The above mentioned publications also disclose a modular structure of the motor stator and motor rotor, which can be used in the design of the embedded motors of the present disclosure.

Figure 16:
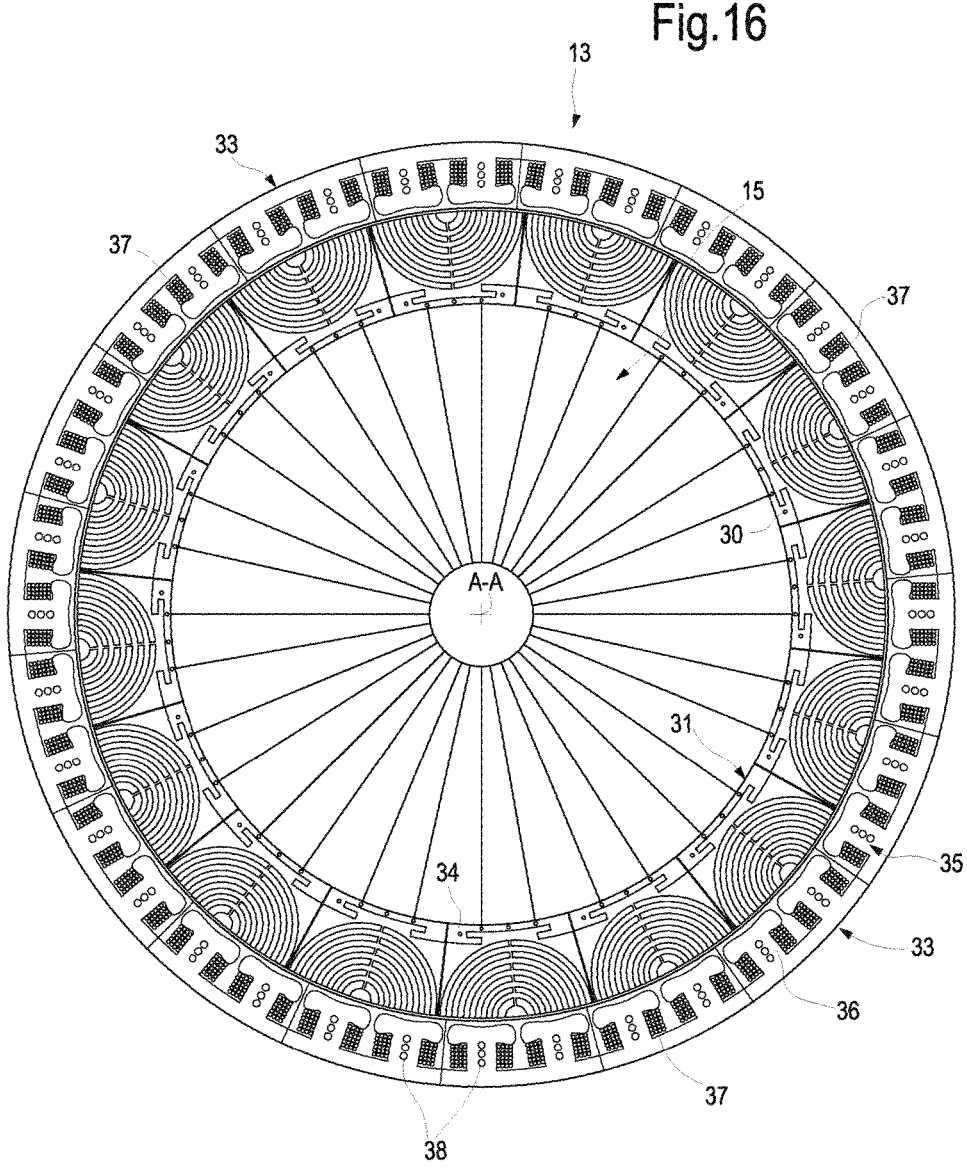
FIG. 16 illustrates a schematic front view of an embedded reluctance electric motor according to further embodiments of the present disclosure.

As mentioned above, the embedded motors can be variable reluctance electric motors, or switched or synchronous reluctance electric motors instead of PM electric motors. A schematic representation of a turbomachine stage with a variable reluctance electric motor of this kind is shown in FIG. 16 in a front view. A variable reluctance electric motor is disclosed e.g. in Italian Patent Application TO2013A000952, filed Nov. 22, 2013 in the name of GE Avio s.r.l. In the exemplary embodiment of FIG. 16 the electric motor has an outer motor stator and an inner motor rotor. In other embodiments, a reversed arrangement can be used, with the motor rotor and the blades surrounding the motor stator, even though this arrangement can be less efficient and to some extent more complex.

In FIG. 16 the turbomachine stage is labeled 13 as a whole and can be any one of stages 13A or 13B of the turbomachine 1. The rotor of the electric motor is labeled 31. The stator of the electric motor is labeled 33 and can be substantially the same as the motor stators 33A, 33B described above in connection with FIGS. 1 to 15.

The motor stator can be comprised of a plurality of annularly arranged ferromagnetic yokes or cores 35. Each yoke can be comprised of two ferromagnetic expansions or arms 36 oriented radially towards the axis A-A of the electric motor and facing the motor rotor 31. Similarly to the previously described examples, the yokes can have a laminar structure, i.e. they can be formed by a plurality of stacked sheets of ferromagnetic material, electrically isolated from one another, for limiting eddy currents in the ferromagnetic cores, as well known from the current art. An electric coil 37 is wound on each radially oriented expansion or arm 36 of the yokes.

According to some embodiments, the motor rotor 31 is formed by a plurality of annularly arranged modular components 30, each of which can be comprised of ferromagnetic portions, co-acting with the electromagnets formed by the coils and yokes of the motor stator 33, and magnetic flux barriers which separate the ferromagnetic portions from one another. Arrangements of ferromagnetic portions and magnetic flux barriers arranged there between in variable reluctance or switching reluctance electric motors are known in the art. Examples of such arrangements are disclosed e.g. in U.S. Pat. No. 7,489,062 and WO2011/154045, the content of which is incorporated herein by reference.

Sealing means 34 can be provided for isolating the modular components of the motor rotor 31 from the impeller, which is schematically shown at 15. Cooling channeling 38 can be provided in the yokes of the motor stator 33.

Figure 17:
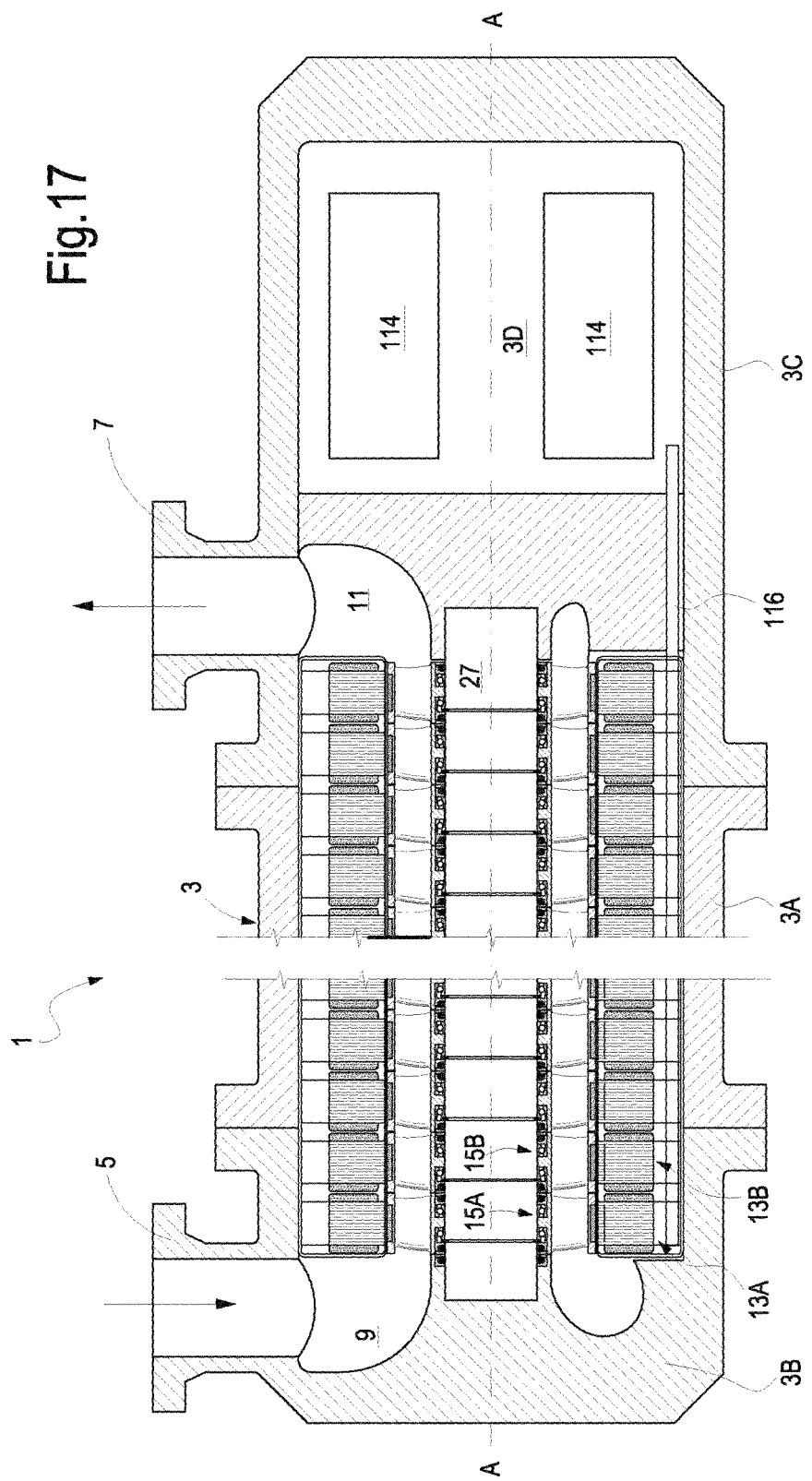
FIG. 17 illustrates a longitudinal cross-sectional view of a turbomachine according to a further embodiment of the disclosure, wherein the electronic control arrangements for the embedded electric motors are located at one end of the turbomachine.

A further embodiment of a turbomachine according to the present disclosure is shown in an axial cross-sectional view in FIG. 17. The same reference numbers designate corresponding parts or elements as shown in the embodiments described here above. These parts or elements will not be described again. The turbomachine 1 shown in FIG. 17 include a casing 3 with an auxiliary compartment 3D, which can be formed for instance in the part 3C of the casing 3. The compartment 3D can house the electronic control system, designated 114 as a whole, for controlling and powering the embedded electric motors of the stages 13A, 13B of the turbomachine 1. One or more cable passageways 116 can be provided for the wiring connecting the embedded motors and the control system 114. The remaining structure of the turbomachine 1, and specifically the arrangement of the motor stators, motor rotors and impeller blades, as well as the arrangement of the inner stationary shaft and of the bearings can be as described above in connection with the other embodiments shown in FIGS. 1 to 16.

Figure 18:
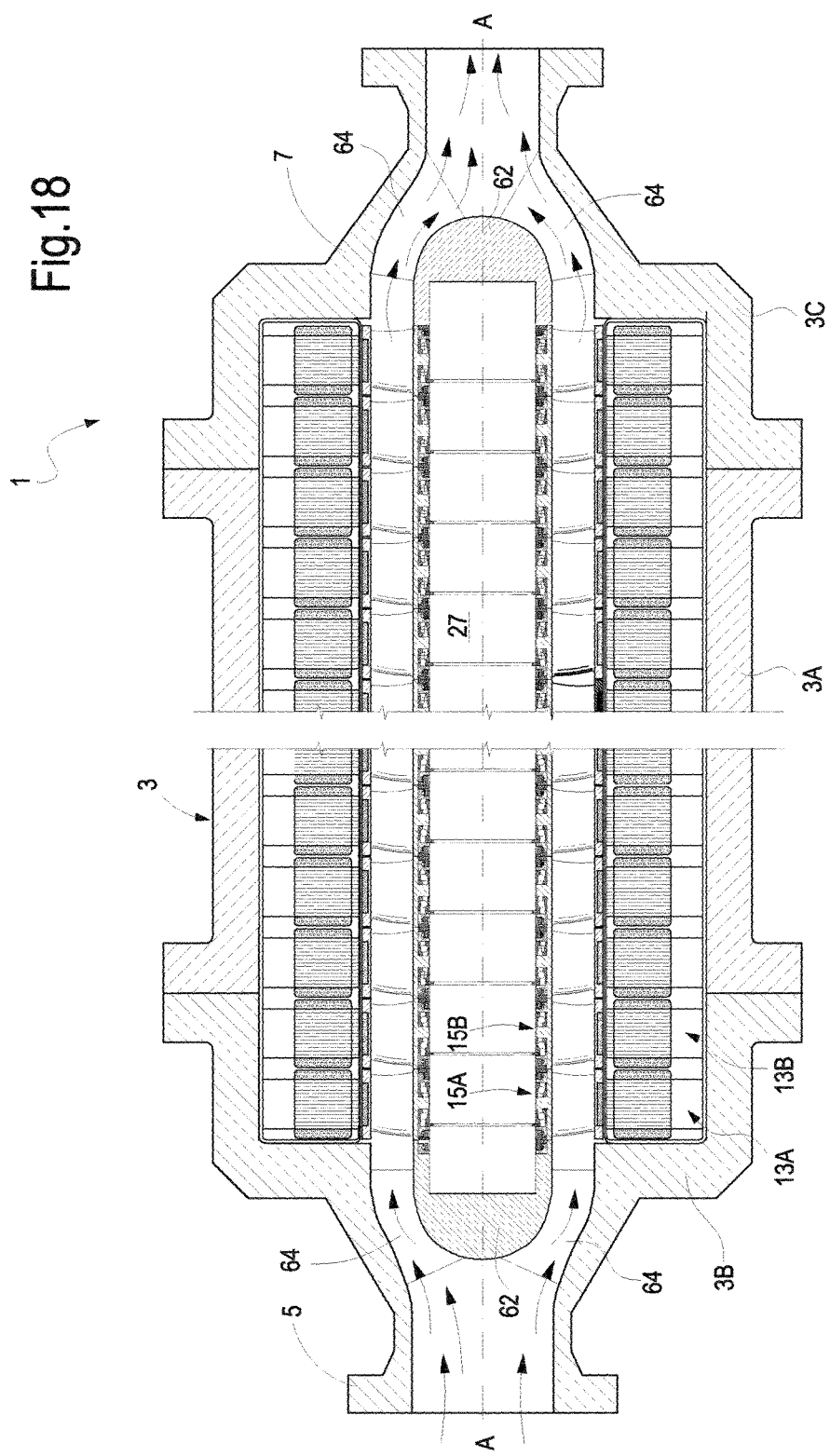
FIG. 18 illustrates a longitudinal cross-sectional view of a further embodiment of a turbomachine according to the disclosure, wherein the inlet and outlet manifolds are aligned axially.

FIG. 18 illustrates a yet further embodiment of a turbomachine according to the present disclosure, in an axial cross-sectional view. The same or corresponding components, parts or elements already described in connection with the previous examples are designated with the same reference numbers and will not be described again. In the embodiment of FIG. 18 the inlet manifold 5 and the outlet manifold 7 of the casing 3 are coaxial, i.e. they are aligned along the rotation axis A-A of turbomachine impellers 15A, 15B. The ends of the central stationary shaft 27 can be mounted in two axially arranged end supports 62, which can be connected to the casing parts 3B, 3C for instance by means of radial baffles 64, defining inlet and outlet passages for the fluid processed by the turbomachine.

Figure 19:
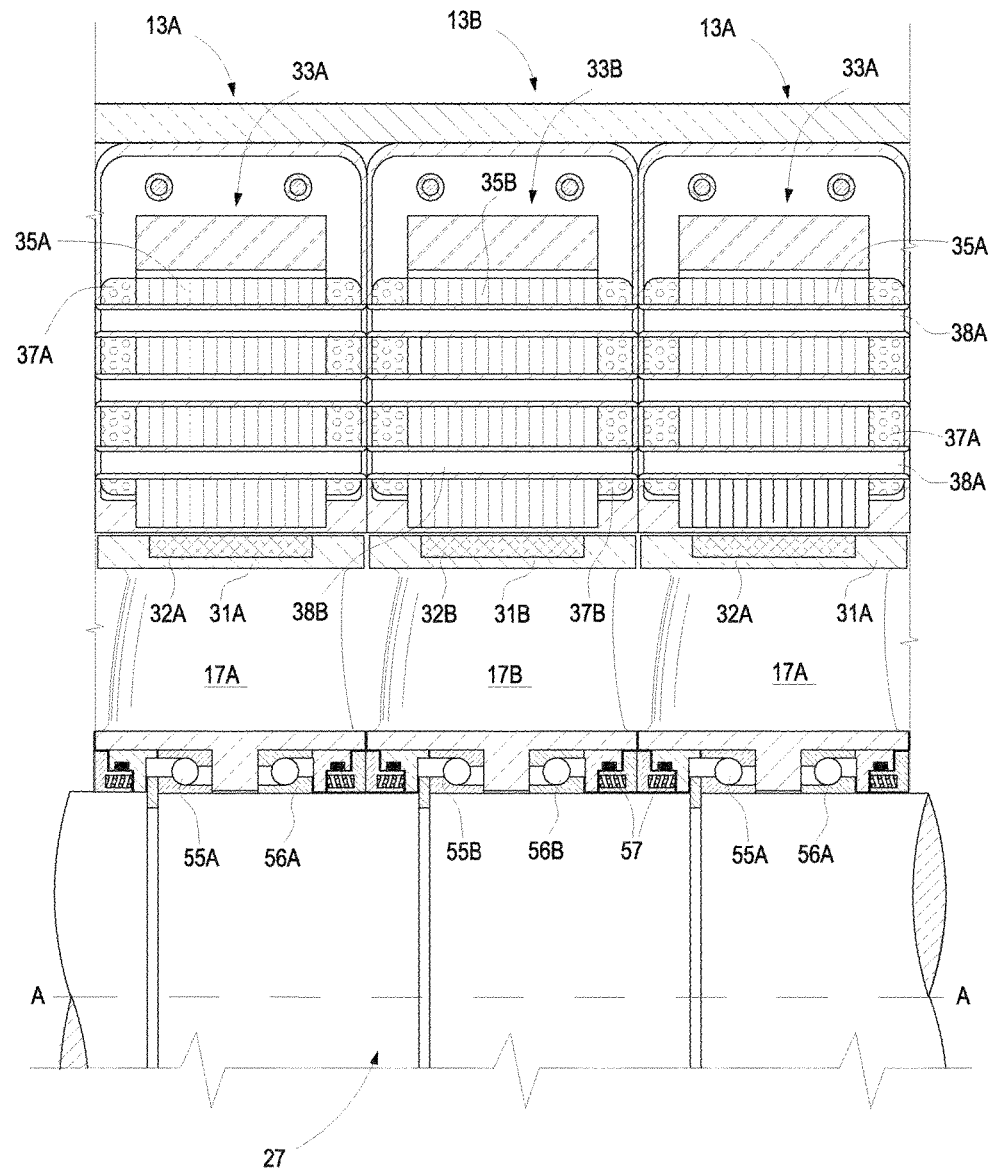
FIG. 19 illustrates an enlarged detail of embodiments of the turbomachine of the present disclosure with an arrangement for cooling the motor stators of the embedded electric motors.

In some embodiments the embedded electric motors, and in particular the motor stators, must be cooled, for instance by circulating a cooling medium such as a liquid or gas, through a suitably arranged cooling channeling, such as channeling 38 shown in cross section in FIGS. 14, 15 and 16. With continuing reference to FIGS. 2 to 18, FIG. 19 illustrates a portion of a turbomachine according to the present disclosure in a section according to a longitudinal axis, i.e. a plane containing the rotation axis A-A of the turbomachine, illustrating the longitudinal development of the cooling channeling 38 according to an exemplary embodiment. The channeling 38 can be formed by longitudinally extending pipes 38A. In some embodiments each pipe can be formed by a plurality of individual pipe sections, each pipe section extending lengthwise across a respective motor stator 33A, 33B of one of the turbomachine stages 13A, 13B. The pipes 38A can extend through the yokes 35A, 35B of the motor stators 33A, 33B. In some embodiments, as shown in FIG. 19, each motor stator 33A, 33B can be contained in a housing 42 surrounded by a sheath or envelope 44. The pipe sections of each motor stator extend through the relevant housing 42 and end at the outer surface of the sheath or envelope 44, such that a continuous longitudinally extending cooling system is obtained by adjoining sheaths or envelopes 44, as shown in FIG. 19.

Figure 20:
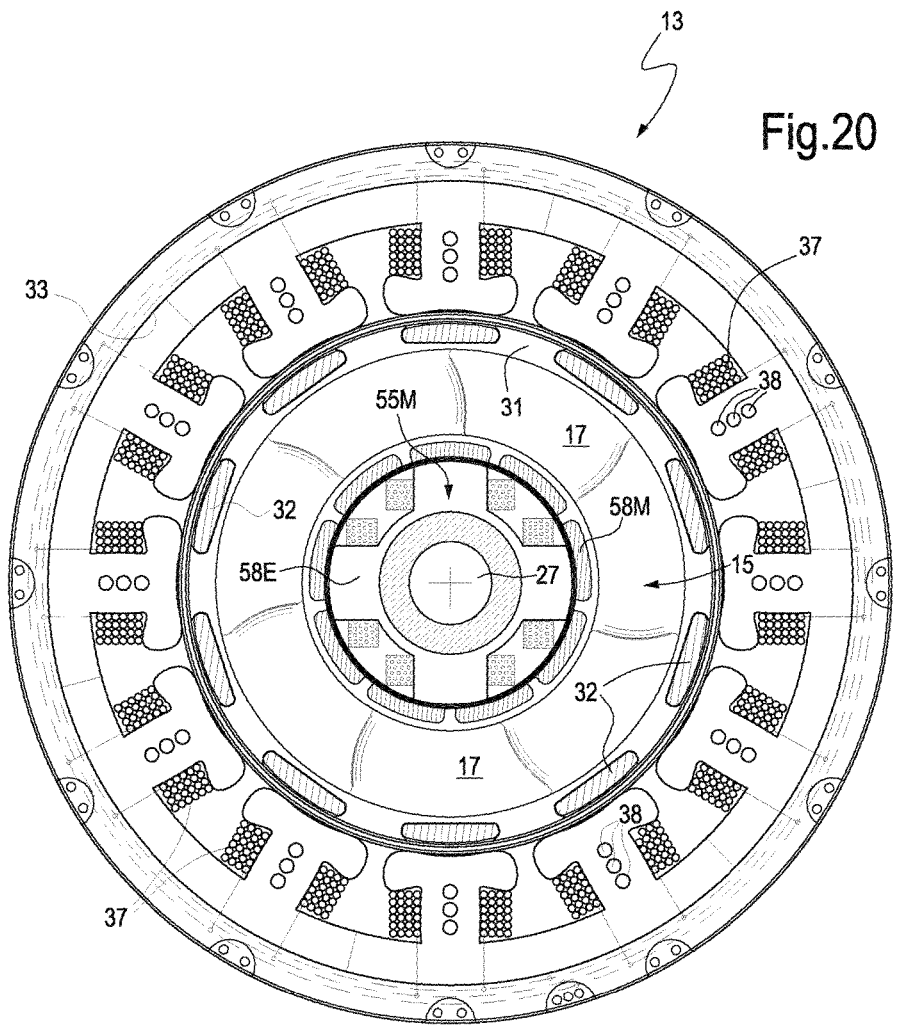
FIG. 20 illustrates a frontal cross section showing an embodiment including active magnetic bearings supporting the impellers.

In some embodiments, as illustrated in FIG. 20, with continuing reference to FIGS. 1 to 19, the impellers of the turbomachine can be supported by active magnetic bearings, instead of or in combination with rolling bearing or journal bearings. In FIG. 20, which illustrates a cross-sectional view of an exemplary embodiment using magnetic bearings, the same reference numbers as used in the previous figures are used for the same or equivalent components, which are not described again. In the figure a generic impeller 15, which can be any one of impellers 15A, 15B, with blades 17 is shown. The impeller 15 is integral with the respective motor rotor 31 and is supported by an active magnetic bearing 55M. The active magnetic bearing 55M can be comprised of inner, electromagnets 55E stationarily supported by shaft 27, and outer permanent magnets 58M integrally rotating with the impeller 15.

In the above described embodiments, the rotational speeds of the axial impellers are controlled such that two sequentially arranged impellers rotate opposite directions and no stationary blades or buckets are arranged between the impellers. This reduces the overall axial dimension of the turbomachine. A large number of impellers can thus be arranged in a relatively small casing, reducing the footprint of the machine. In some embodiments, however, one or more annular arrangements of stationary blades can be provided between two serially arranged impellers. In this case, the two impellers arranged immediately adjacent the stationary blades, i.e. the impellers upstream and downstream the stationary blades rotate in the same direction. One or more annular arrangements of stationary blades can be foreseen for instance if radial support of the shaft 27 is requested. An intermediate radial support for the shaft is connected to the machine casing through the stationary blades, which form stationary vanes for the passage of the fluid. Intermediate radial support can be useful for instance in case of relatively long and/or relatively thin shafts.

The above described embodiments of a multistage turbomachine with embedded electric motors allow independent control of the rotary speed of each stage impeller for optimum operation of the turbomachine when processing a multiphase fluid flow, especially when the turbomachine operates at variable gas volume fraction percentages (GVF %) or liquid volume fraction percentages (LVF %), i.e. distant from a design GVF % value or LVF % value.

According to some embodiments, broadly speaking the rotary speeds of the sequentially arranged turbomachine stages can be controlled so that the rotary speed of the stages is reduced from the most upstream to the most downstream stage of the turbomachine when GVF % is greater than zero. This takes into account that the volumetric flow rate diminishes as the fluid pressure increases, due to the compression of the gaseous fraction contained in the processed fluid. The reduction of the rotary speed of the sequentially arranged stages maintains the velocity angles substantially constant, thus maximizing the efficiency of each stage and thus of the turbomachine in its entirety.

In case of GVF % variation during operation of the turbomachine, due to the change in gas content in the incoming fluid flow, the overall compressibility of the fluid changes. More specifically, the overall compressibility of the incoming flow increases with increasing GVF %. Thus the speed difference between subsequently arranged stages must be adapted to the varied compressibility of the incoming fluid flow.

As a general rule, the higher the GVF % of the incoming fluid flow, the larger the speed difference between first and last turbomachine stages, since a larger amount of gas in the incoming fluid increases the fluid compressibility and thus the variation of the volumetric flow rate across the stages. Use of independent embedded electric motors allows adapting the machine operation to variable GVF % and thus maximizing the turbomachine efficiency even when the turbomachine operates far from the design GVF % values.

Figure 21:
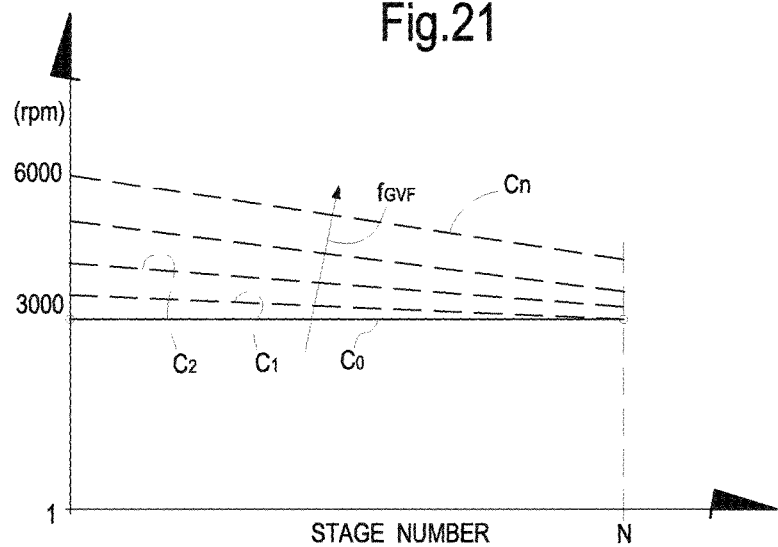
FIGS. 21 and 22 illustrate diagrams of the rotary speeds of sequentially arranged turbomachine stages for different gas volume fraction percentages of the fluid being processed by the turbomachine in different embodiments.

FIG. 21 shows a schematic diagram illustrating how the rotary speed of the sequentially arranged stages can theoretically be controlled following variations of the gas volume fraction percentage GVF % at the turbomachine inlet. The stage number is reported on the horizontal axis, 1 being the most upstream stage and N being the most downstream stage with respect to the flow direction across the turbomachine. The rotary speed (expressed in rpm) is reported on the vertical axis. Each curve Ci (i=0 . . . n) plotted in FIG. 21 represents the speed variation across the sequentially arranged turbomachine stages. Different curves correspond to different GVF % at the turbomachine inlet. The GVF % increases from one curve Ci to the next according to arrow $f_{GVF}$ in FIG. 21.

The diagram of FIG. 21 specifically refers to a turbomachine which has been designed for processing a liquid flow, i.e. with a GVF %=0 at the inlet. Since a liquid is substantially incompressible, the volume flow rate remains constant across the entire turbomachine and therefore the sequentially arranged stages are similar or identical to one another as far as the flow cross-sectional area is concerned. This is the case for instance of the exemplary turbomachines shown in FIGS. 1 to 19. Under design conditions the various stages rotate at the same rotary speed. Thus in FIG. 21 the design condition operation is represented by curve C0, which is parallel to the horizontal axis (same rpm for all stages).

If gas is contained in the inlet flow, i.e. if the GVF % at the machine inlet increases from zero to a positive value, the turbomachine will not operate at design conditions anymore. Since the fluid becomes now compressible, and its compressibility increases with increasing GVF %, the operation of the turbomachine is modified by changing the rotary speed of the various stages. Broadly speaking, the operating conditions of the turbomachine move from curve C0 towards curve Cn with increasing GVF %. The rotary speed of the first turbomachine stage increases, to take into consideration that if gas is present in the inlet flow, the mean density of the fluid does not remain constant, but rather increases when moving from the first towards the last machine stage, with increasing pressure. As the volume rate reduces moving from one stage to the next as a consequence of increasing density, the speed of the stages following serially along the machine gradually reduces as shown in FIG. 21.

The larger the volume percentage of gas fraction in the inlet flow, the higher the rotary speed of the first stage in the turbomachine, as can be appreciated comparing the curves C1-Cn in FIG. 21. Moreover, higher gas amount in the flow requires a greater variation of the rotary speed from one stage to the next, i.e. a steeper speed-vs-stage number curve.

In more general terms, the turbomachine can be designed for processing a mixed flow, i.e. a fluid flow containing a GVF % different than zero. In this case, when the machine operates at design conditions with a set GVF %, the rotary speed of the various stages will be identical. If the amount of the gas volume in the inlet flow decreases (i.e. if the GVF % becomes lower than the design value, the first stage will be slowed down and the speed of the intermediate stages will be controlled to gradually increase from the minimum rotary speed of the first stage to the speed of the last stage. If the amount of gas increases with respect to the design value, i.e. if GVF % of the inlet flow increases, the rotary speed of the first stage will increase and the speed of the following intermediate stages will be adapted accordingly, i.e. will gradually drop till reaching the rotary speed of the last stage.

Figure 22:
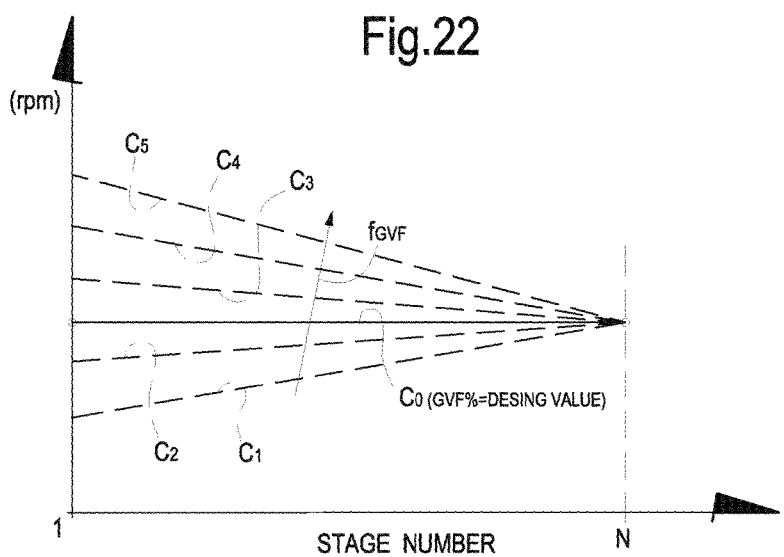

This general situation is summarized in FIG. 22. Curve C0 represents again the distribution of the rotary speeds of the various stages when the turbomachine operates under design conditions: each stage rotates at the same rotary speed. C1 and C2 represent conditions where the GVF % at machine inlet is lower than the design GVF %. Curves C3, C4 and C5 represent operating conditions with increasing gas content in the inlet flow, i.e. GVF % above the design GVF %, and increasing from curve C3 to curve C5.

According to some embodiments, the rotary speed rates of the turbomachine stages can be adapted to the GVF % at the machine inlet, detecting or calculating the GVF % of the mixed phase inlet flow.

Control of the embedded electric motors can be based on the capability of setting the motor torque or the motor speed for each stage. According to some embodiments, speed control is performed by setting a speed gain for each stage. The stage gain can be obtained by setting a fixed gain and multiplying the fixed gain by a variable which is different for each stage. The different variables can be determined based on fluid compressibility measurements at the inlet of the turbomachine.

Examples of stage rotary speed control algorithms will be described here below.

Example A

According to some embodiments, the rotational speed of the various machine stages can be controlled starting from the measurement of the following parameters: suction side pressure P1; delivery side pressure P2, suction side temperature T1, delivery side temperature T2, total mass flow rate m, power absorbed by each electric motor $W_i$, liquid and gas density at the suction side.

The total work transferred to the fluid is given by $$Li_{tot} = \frac{\eta W_{tot}}{m} \quad \text{(eq. 1)}$$

where $W_{tot}$ is the total power delivered by the electric motors and η is the efficiency which can be stored e.g. in table form in a memory accessible by the control unit of the turbomachine and is retrievable based on the measured operating parameters.

The total work $Li_{tot}$ transferred to the fluid is given also by the sum of the work delivered to the liquid fraction and to the gas fraction of the fluid, respectively, which is expressed as follows:

$$Li_{tot} = (1-x)\frac{(P2-P1)}{\rho L} + \frac{x}{np}P1\frac{1}{\rho_{1gas}}\left(\frac{P2}{P1}\right)^{(np-1)} \quad \text{(eq. 2)}$$

wherein:
x is the gas mass fraction of the fluid being processed;
ρL is the density of the liquid fraction in the fluid being processed;
$\rho_{1gas}$ is the gas density at the turbomachine inlet (suction side);

$$np = \frac{(n-1)}{n};$$

and
n being the polytropic exponent.

Using the suction temperature T1 and the delivery temperature T2, additional equations can be written, which involve the specific heat of the multiphase fluid as follows:

$$Li_{tot} = Cp_{mix}\eta(T2-T1) \quad \text{(eq. 3)}$$

$$Cp_{mix} = \frac{zR}{np} \quad \text{(eq. 4)}$$

wherein:
$Cp_{mix}$ is the specific heat of the multiphase mix; and
zR is the elastic constant of the gas at the suction side.

Solving the system of equations (1) to (4) the gas mass fraction x and the polytrophic exponent n can be determined. Based upon x and P1 an optimal distribution of the pressure increase in each stage between P1 and P2 can be set and stored in table form. Assuming n and x constant for all the stages, applying equation (2) to the single stage, the work provided by each stage can be calculated as follows:

$$Li = (1-x)\frac{(P2-P1)}{\rho L} + \frac{x}{np}P1\frac{1}{\rho_{1gas}}\left(\frac{P2}{P1}\right)^{(np-1)}$$

Finally, equation (1) is used to calculate the power set point for each stage $$Wi = Li\frac{m}{\eta}$$

According to some embodiments, the power set point can be used in different ways to control the turbomachine. According to one embodiment, the torque applied by each electric motor can be detected, e.g. based on a measurement of the electric current absorbed by the electric motor. Based on the measured torque and the calculated power set point (Wi), the set-point rotational speed ($\omega_i$) of the respective $i^{th}$ impeller is determined. In other embodiments, if the rotational speed ($\omega_i$) of the impeller of the $i^{th}$ stage is detected, the set-point torque is calculated based on the detected rotational speed and of the calculated power (Wi) at set-point.

In order to remove or reduce errors deriving from the model adopted and from the measures of the parameters involved in the calculations, a corrected rotational speed of each stage ($\omega_{j\text{-}corr}$) can be calculated starting from the rotational speed of the stage calculated as above described multiplied by the ratio between the rotational speed $\overline{\omega}_{set}$ obtained by a closed loop control on the pressure difference (P2−P1) and the mean value of the rotational speeds of the stages obtained as above described. The corrected rotational speed for the $j^{th}$ stage would then be:

$$\omega_{j-corr} = \omega_j * \overline{\omega}_{set} \frac{N}{\sum_{i=1}^{N} \omega_i}$$

Example B

In order to simplify the control algorithm and to avoid the need of calculating the gas volume fraction, according to a second approach, instead of separately calculating the rotational speed for each stage, a coefficient ks can be introduced and used to set the rotational speed ($\omega_i$) of each $i^{th}$ stage as follows:

$$\omega_i = \overline{\omega}\left(1 + ks\frac{N}{2-i}\right)$$

where $\overline{\omega}$ is the average rotational speed.

The parameter ks is calculated empirically based on parameters which can be measured, such as T2/T1; P2/P1; flow rate, average rpm. In this approach, control on the average rotational speed is a closed-loop control, while the control on the rotational speed of each stage is an open-loop control.

Example C

According to a third exemplary embodiment, a first control loop is provided, which controls the rotary speed of each stage based on the pressure difference across the turbomachine, in order to maintain the pressure difference at or around a set-point upon variation of the GVF. A second, slower control loop can be provided, which tracks a minimum power absorption.

More in detail, being $\Delta P_{set}$ the set-point of the pressure difference, and being $\Delta P$ the measured pressure difference between delivery and suction side of the turbomachine, an average rotary speed variation $\Delta\overline{\omega}$ is calculated as follows:

$$\Delta\overline{\omega} = -k_1(\Delta P - \Delta P_{set})$$

A set-point average rotary speed is then calculated as $$\overline{\omega}_{set} = \frac{\sum_{i=1}^{N} \omega_i}{N} + \Delta\overline{\omega}$$

$\omega_i$ being the rotary speed of the $i^{th}$ stage and N being the total number of stages in the turbomachine. The set-point of the rotary speed ($\omega_{i\text{-}set}$) of each $i^{th}$ stage is then calculated as a function of the set-point average rotary speed, taking into consideration that the rotary speed of each stage is different from the rotary speed of the adjacent stage(s). For instance, a linear rotary speed distribution can be calculated as follows:

$$\omega_{i-set} = \overline{\omega}_{set} * \left[1 - k_s\left(\frac{N}{2} - i\right)\right]$$

where $k_s$ is a correction factor. More complex, non-linear rotary speed distributions can be calculated, instead.

If needed the $\omega_{i\text{-}set}$ value can be corrected as follows:

$$\omega_{i-set} = \omega_{i-set} * \overline{\omega}_{set} \frac{N}{\sum_{i=1}^{N} \omega_i}$$

to take into account GVF variations occurring while the control algorithm is being performed.

The factor $k_s$ used to calculate the rotary speed of each embedded electric motor of each stage can be controlled using a second, slow-speed control loop which calculates the optimum $k_s$ value which minimizes the total power (W) absorbed by the embedded motors. The optimizing control loop can include the step of perturbing the $k_s$ and observe whether the perturbation causes an increase or decrease of the total power absorbed by the electric motors. The algorithm can be as follows:

10 $k_s(t)=k_s(t-1)*1.01$
   i. if W(t)≤W(t−1) then go to 10
20 $k_s(t)=k_s(t-1)*0.99$
   ii. if W(t)<W(t−1) then go to 20 where W(t) is the instant total power absorbed at time (t) by the embedded electric motors. The value of $k_s(t)$ is thus modified to maintain the total power at a minimum, by selecting the optimum distribution of rotary speeds for the sequentially arranged stages.

In the above described embodiment, a single correction factor $k_s$ is used and the rotary speed distribution is linear. More complex algorithms can be envisaged, using more than one correction factors and a non-linear rotary speed distribution.

Example D

According to a fourth exemplary embodiment, the control algorithm is based on the idea of maximizing power exploitation by operating the various stages at a constant load factor.

The turbomachine is controlled such that a set pressure difference between delivery and suction is maintained. Being $\Delta P_{set}$ the set point of the pressure difference, and being $\Delta P$ the measured pressure difference between delivery and suction side, a first control loop is provided, which calculates the variation ($\Delta\bar{\omega}$) of average rotary speed $\bar{\omega}$ required to move the operating conditions of the turbomachine towards the set-point of the pressure difference again. An average rotary speed variation $\Delta\bar{\omega}$ is calculated as follows:

$$\Delta\bar{\omega} = -k_1(\Delta P - \Delta P_{set})$$

wherefrom an average set-point value of the rotary speed is calculated as follows:

$$\bar{\omega}_{set} = \frac{\sum_{i=1}^{N}\omega_i}{N} + \Delta\bar{\omega}$$

$\omega_i$ being the rotary speed of the $i^{th}$ stage and N being the total number of stages in the turbomachine. The variation of rotary speed for each $i^{th}$ stage is calculated by calculating a torque set-point ($C_{set}$), each embedded electric motor being controlled so as to provide the same torque and thus providing the same variation of angular momentum to the flow stream. The torque set-point is calculated as follows:

$$C_{set} = \frac{1}{N}\sum_{i=1}^{N}\frac{W_i}{\omega_i}$$

wherein $W_i$ is the power absorbed by the electric motor of the $i^{th}$ stage. I.e. the torque set-point $C_{set}$ is made equal the average torque. A rotary speed variation ($\Delta\omega_i$) for each $i^{th}$ stage is then calculated as follows:

$$\Delta\omega_i = N * k_2 \frac{\bar{\omega}_{set}}{\sum_{i=1}^{N}\omega_i} * \frac{C_i - C_{set}}{C_{set}}$$

wherein $C_i$ is the torque of the $i^{th}$ stage. The torque correction for each $i^{th}$ stage is calculated as follows:

$$\Delta C_i = k_3 \Delta\omega_i$$

Other control algorithms can be developed, based e.g. on combinations or variations of the above exemplary algorithms.

In general, using embedded motors with a control system capable of controlling the speed of the different electric motors one independently of the other, a control method can be used which modifies at least one operating parameter of the electric motors, in order to take into account the compressibility variation of the working fluid, e.g. due to variation of the GVF % or LVF %. In general terms, the turbomachine can be controlled so that one or more of the following operating parameters of the embedded motors can be modified to compensate for compressibility variation: rotational speed; torque; absorbed power, or combination thereof.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims.

For instance, even though the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What is claimed is:

1. A multistage turbomachine, comprising:
a casing with a fluid inlet and a fluid outlet; and
a plurality of stages sequentially arranged in the casing with a first stage positioned adjacent the fluid inlet, a last stage positioned adjacent the fluid outlet and at least one intermediate stage positioned between the first stage and the last stage; wherein:
a flow path extends from the fluid inlet to the fluid outlet through the sequentially arranged stages;
each stage is comprised of a rotating impeller and an electric motor embedded in the casing and arranged for rotating the impeller at a controlled rotary speed;
each electric motor comprises a motor rotor arranged on the impeller and integrally rotating therewith and a motor stator stationarily arranged in the casing;
pairs of sequentially arranged impellers are configured for rotation in opposite directions; and
a control arrangement configured and arranged to rotate each impeller at a rotational speed which can vary from one impeller to the other,
wherein the control arrangement controls the rotary speed of the stages to be identical at a set gas volume fraction (GVF) %; if the GVF % becomes lower than the set GVF %, the control arrangement controls the rotary speed of the first stage to be decreased and the rotary speed of the at least one intermediate stage to be increased; and if the GVF % becomes higher than the set GVF %, the control arrangement controls the rotary speed of the first stage to be increased and the rotary speed of the at least one intermediate stage to be decreased.

2. The turbomachine of claim 1,
wherein at least some of the stages comprise serially arranged axial impellers and at least some of the stages comprise serially arranged radial impellers.

3. The turbomachine of claim 1, wherein the impellers rotating in opposite directions are arranged directly adjacent to one another.

4. The turbomachine of claim 1, wherein the control arrangement is configured for controlling at least one parameter of the electric motors as a function of at least one compressibility-related parameter.

5. The turbomachine of claim 4, wherein the at least one parameter of the electric motors is selected from the group consisting of: the rotational speed, the torque, the power, or a combination thereof.

6. The turbomachine of claim 4, wherein the at least one compressibility-related parameter is proportional to the gas volume fraction of the fluid.

7. The turbomachine of claim 1, further comprising a central, non-rotating shaft.

8. The turbomachine of claim 1, wherein the impellers of at least some of the stages are supported on the respective motor stators by respective bearings.

9. The turbomachine of claim 1, wherein the motor stator of at least some of the stages is arranged around the respective motor rotor mounted on the impeller, wherein the motor stator is surrounding the motor rotor.

10. The turbomachine of claim 1, further comprising supporting bearings lubricated and cooled by the fluid processed by the turbomachine.

11. The turbomachine of claim 1, further comprising:
a liquid/gas separator arranged downstream of the fluid outlet; and
at least one of a liquid recirculating duct and a gas recirculating duct;
wherein the liquid recirculating duct is in fluid communication with liquid-refrigerated supporting bearings of at least some of the impellers, and/or the gas recirculating duct is in fluid communication with a gap between the motor stator and the motor rotor of at least some of the impellers.

12. The turbomachine of claim 1, wherein the motor rotor of at least some of the stages comprises permanent magnets.

13. The turbomachine of claim 12, wherein at least some of the impellers are provided with an impeller shroud, and wherein the permanent magnets thereof are arranged at the shroud of the respective impeller.

14. The turbomachine of claim 1, wherein each stage comprises a power control circuit arranged in the casing, configured to control the relevant electric motor.

15. The turbomachine of claim 1, wherein the rotary speeds of the stage impellers are controlled so as to be reduced from upstream to downstream, upon an increase of fluid density across the stages.

16. The turbomachine of claim 1, wherein the embedded electric motors comprise a motor stator with a modular structure, comprised of a plurality of yokes circumferentially arranged around a rotation axis, each yoke including at least one electric coil wound around a respective magnetic core.

17. A method for boosting the pressure of a variable-compressibility fluid, the method comprising:
sequentially arranging a plurality of impellers for rotation in a casing of a turbomachine with a first impeller positioned adjacent a fluid inlet of the casing, a last impeller positioned adjacent a fluid outlet of the casing and at least one intermediate impeller positioned between the first impeller and the last impeller;
rotating the sequentially arranged impellers in opposite directions with a respective electric motor embedded in the casing;
processing a fluid through the impellers;
boosting a fluid pressure from a suction pressure to a delivery pressure;
controlling at least one operating parameter of the embedded motors such that impellers rotate at different rotational speeds;
controlling the rotary speed of the impellers to be identical at a set gas volume fraction (GVF) %;
controlling the rotary speed of the first stage to be decreased and the rotary speed of the at least one intermediate stage to be increased if the GVF % becomes lower than the set GVF %; and
controlling the rotary speed of the first stage to be increased and the rotary speed of the at least one intermediate stage to be decreased if the GVF % becomes higher than the set GVF %.

18. The method of claim 17, wherein the at least one operating parameter of the embedded motors is controlled as a function of a parameter related to compressibility of the fluid.

19. The method of claim 17, further comprising rotating the embedded motors at a rotational speed which decreases from a most upstream impeller to a most down-stream impeller.

20. The method of claim 18, further comprising rotating the embedded motors at a rotational speed which decreases from a most upstream impeller to a most down-stream impeller, and wherein a speed difference between the most upstream impeller and the most downstream impeller is set as a function of a parameter related to the compressibility of the fluid.

* * * * *